(12) United States Patent
Tatewaki

(10) Patent No.: US 8,530,376 B2
(45) Date of Patent: *Sep. 10, 2013

(54) REVERSIBLE THERMOSENSITIVE RECORDING MEDIUM

(75) Inventor: Tadafumi Tatewaki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,843

(22) Filed: Aug. 30, 2012

(65) Prior Publication Data

US 2013/0059727 A1    Mar. 7, 2013

(30) Foreign Application Priority Data

Sep. 2, 2011    (JP) .................................. 2011-191933

(51) Int. Cl.
*B41M 5/41* (2006.01)

(52) U.S. Cl.
USPC .......................................... 503/200; 503/201

(58) Field of Classification Search
None
See application file for complete search history.

(56) References Cited

U.S. PATENT DOCUMENTS

| 2010/0311579 A1 | 12/2010 | Koga et al. |
| 2011/0224073 A1 | 9/2011 | Owashi et al. |

FOREIGN PATENT DOCUMENTS

| EP | 2077188 A2 | 7/2009 |
| EP | 2264652 A1 | 12/2010 |
| JP | 2003-99748 | 4/2003 |
| JP | 2003-127570 | 5/2003 |
| JP | 2004-110581 | 4/2004 |
| JP | 2006-201901 | 8/2006 |
| JP | 4043867 | 11/2007 |
| JP | 2008-262527 | 10/2008 |
| JP | 2011-18318 | 1/2011 |

OTHER PUBLICATIONS

European Search Report dated Dec. 12, 2012 in connection with counterpart.
European patent application No. 12 18 2674.7.

*Primary Examiner* — Bruce H Hess
(74) *Attorney, Agent, or Firm* — Cooper & Dunham LLP

(57) ABSTRACT

To provide a reversible thermosensitive recording medium, which contains: a base; and a reversible thermosensitive recording layer disposed on the base, wherein the base contains a first support, an electronic information recording module, an adhesive covering the first support, and a second support in a surface of which a groove is formed as a laser mark by laser marking, and wherein a ratio of a maximum depth A to a total thickness of the reversible thermosensitive recording medium is 20% or less, where the maximum depth A is a length from the surface of the second support to a bottom of the groove of the laser mark with respect to a thickness direction of the reversible thermosensitive recording medium.

12 Claims, 7 Drawing Sheets

Area around intersection

REVERSIBLE THERMOSENSITIVE RECORDING MEDIUM

BACKGROUND OF THE INVENTION

1. Field of the Invention

The present invention relates to a reversible thermosensitive recording medium.

2. Description of the Related Art

IC cards incorporated therein with an electronic information module including an IC chip (electronic information recording element) and an antenna circuit have been introduced in various industries, such as cash cards, credit cards, pre-paid cards; cards used for public transport, such as railway, bus, and motor way services; member's cards for digital broadcasting services, or 3G mobile phone services; and cards such as library cards, student cards, employee ID cards, and resident registration cards; and have been used in various field from use in every day life to business use.

Meanwhile, paper has been still used for work sheets, and instructions (e.g., a parts control manifest, and a process control manifest), which are larger in size than a card. Along advancement of economic social activities, such as mass production, mass consumption, and mass disposal, therefore, there are problems that quantities of paper produced, consumed, and disposed increases, and as a result, load to the environment increases.

Accordingly, there is a need for a recording medium having a larger size than the card incorporated therein with an electronic information module, using the technology of the IC card.

Even with the IC cards, the disposal amount thereof cannot be suppressed unless they can be repeatedly used. Accordingly, there is a need for reducing consumption of resources and reducing environmental load by promoting effective use or recycling of resources.

There is disclosed use of a reversible thermosensitive recording medium as the IC card, and the reversible thermosensitive recording medium to which the electronic information recording module is incorporated, and which has a reversible thermosensitive recording layer in which a visible image can be formed and erased. Use of the reversible thermosensitive recording medium can reduce the disposal amount of the IC cards, as the reversible thermosensitive recording medium can display recorded information as a visible image as well as rewriting internal information of the IC chip, and can repeatedly used.

The IC cards may be broken, or cause troubles during use thereof. In such a case, a manufacturer determines the production date and production lot of the IC card, and then researches the production history of the relevant lot, investigates a fault defect, and investigates an influence to other lots produced on the same production date, and the same process number.

Conventionally, as for a method for determining the production date or production lot of the IC card, a method for marking (numbering) characters on a front or back surface of the IC card has been used. Specifically, examples thereof include: an embossing method, in which a character pattern is embossed against a surface of a card so that a mark appears three-dimensionally on the surface of the card; a thermal transfer method in which a transfer leaf is thermally transferred onto a surface of a card by means of a thermal head; and a laser marking method, in which a portion of a surface of a card is burned and removed by laser.

In the case where the reversible thermosensitive recording medium is used for the IC card, however, troubles may be caused with the reversible thermosensitive recording medium when a mark is formed by the embossing method or thermal transfer method. The reversible thermosensitive recording medium is typically, subjected to formation or erasure of an image in a reversible thermosensitive recording layer by means of a heating device of a printer, such as a thermal head, an erasure bar, an erasure roller, and an erasure plate, after the marking. In the case where formation or erasure of an image in the reversible thermosensitive recording layer is performed by the heating device after the mark is formed by the embossing method, there is a problem that a printing failure or erasing failure occurs. In the case where formation or erasure of an image is repeatedly performed on the reversible thermosensitive recording layer by the heating device after the mark is formed by the thermal transfer method, there is a problem that the transfer leaf starts to peel off.

Accordingly, as the method for forming a mark in the reversible thermosensitive recording medium, the laser marking method is preferably used (see Japanese Patent Application Laid-Open (JP-A) No. 2008-262527).

As the laser marking method, there have been known a technique for forming a mark, which has high contrast to the background, and is hardly impaired in terms of a shape of a character, on a card-type information recording medium (see JP-A No. 2004-110581), a technique for forming a laser mark (groove) in a non-transparent layer of a card-shaped recording medium having the non-transparent layer on a front or back surface of a base material, to the extent where a surface of the under layer on which the non-transparent layer has been formed can be visually observed (see JP-A No. 2003-127570); and a technique for laser marking a surface of a card base material to give a depth of 15 µm or less (see JP-A No. 2006-201901).

In any of these techniques, however, there are problems that visibility of the mark is not sufficient. Further, these techniques are not directed to a reversible thermosensitive recording medium, and cannot be used repeatedly, hence cannot solve the problem of the environmental load.

The present inventors have found a new problem that, when an image is formed in a reversible thermosensitive recording layer after laser marking a reversible thermosensitive layer, which has the reversible thermosensitive layer on a base, and a laser mark is to be formed in a surface of the base opposite to the surface thereof on which the reversible thermosensitive recording layer has been formed, missing image (white missing part) is left and a printing failure occurs in an area of the reversible thermosensitive recording layer, which is a corresponding area on the opposite side of the laser mark. Further, it has been found that the white missing part becomes more significant after repeated use of the reversible thermosensitive recording medium. In the case where the reversible thermosensitive recording medium cannot be used repeatedly, it is disadvantageous in terms of a cost, because the reversible thermosensitive recording medium has an electronic information recording module, which is an expensive member.

SUMMARY OF THE INVENTION

The present invention aims to provide a reversible thermosensitive recording medium, which contains a reversible thermosensitive recording layer on a base to which an electronic information recording module is incorporated, and has a laser mark formed in a surface of the base opposite to a surface thereof on which the reversible thermosensitive recording layer is provided, and which can form images of excellent quality without leaving any white missing part in an image when an image is formed in the reversible thermosensitive layer after a laser mark has been formed, and can stably carried out coloring and decoloring.

The means for solving the aforementioned problem is as follows:

A reversible thermosensitive recording medium, which contains:

a base; and a reversible thermosensitive recording layer disposed on the base, wherein the base contains a first support, an electronic information recording module, an adhesive covering the first support, and a second support in a surface of which a groove is formed as a laser mark by laser marking, and wherein a ratio of a maximum depth A to a total thickness of the reversible thermosensitive recording medium is 20% or less, where the maximum depth A is a length from the surface of the second support to a bottom of the groove of the laser mark with respect to a thickness direction of the reversible thermosensitive recording medium.

The present invention can solve the various problems in the art, and the problems found by the present inventors, can achieve the aforementioned object, and can provide a reversible thermosensitive recording medium, which contains a reversible thermosensitive recording layer on a base to which an electronic information recording module is incorporated, and has a laser mark formed in a surface of the base opposite to a surface thereof on which the reversible thermosensitive recording layer is provided, and which can form images of excellent quality without leaving any white missing part in an image when an image is formed in the reversible thermosensitive layer after a laser mark has been formed, and can stably carried out coloring and decoloring.

Figure 1:
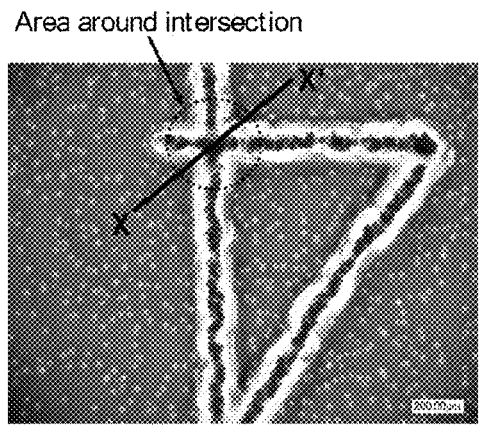
FIG. 1 is a diagram illustrating one example of a mark, a number "4," which has been laser marked on a surface of a second support.

DETAILED DESCRIPTION OF THE INVENTION (Reversible Thermosensitive Recording Medium)

The reversible thermosensitive recording medium of the present invention contains a base, and a reversible thermosensitive recording layer disposed on the base, and may further contain other layers, if necessary.

The base contains a first support, an electronic information recording module, an adhesive covering the first support, and a second support in a surface of which a groove is formed by laser marking.

<Base>

The base contains the first support, the electronic information recording module, the adhesive, and the second support. It is preferred that the first support and the second support be bonded to together with the adhesive. In this case, the reversible thermosensitive recording layer is provided on the first support, and the second support is arranged in the reversible thermosensitive recording medium, on an opposite side of the reversible thermosensitive recording medium to the side where reversible thermosensitive recording layer is provided. Accordingly, in the present invention, the term "a surface of a second support" and the term "a surface of a base" mean the same.

A shape, structure and size of the base are appropriately selected depending on the intended purpose without any limitation. Examples of the shape thereof include a square, and a circle. Examples of the structure thereof include a block structure, and a layer structure. The layer structure may be a single layer structure, or a laminate structure. The size thereof is appropriately selected depending on a use thereof.

<<Second Support>>

The second support has a groove formed by laser marking at a surface thereof.

A shape, structure and size of the second support are appropriately selected depending on the intended purpose without any limitation. Examples of the shape thereof include a square, and a circle. As for the structure thereof, a sheet structure is preferable, and examples thereof include a single layer structure and a laminate structure. The size thereof is appropriately selected depending on a use thereof.

A material of the second support is appropriately selected depending on the intended purpose without any limitation, and examples thereof include a resin, rubber, synthetic paper, metal, glass, and a combination thereof. Among them, the resin is particularly preferable.

The resin is appropriately selected depending on the intended purpose without any limitation, and examples thereof include polyethylene terephthalate (PET), polycarbonate, polystyrene, and polymethyl methactylate. These may be used independently, or in combination. Among them, polyethylene terephthalate is particularly preferable.

The second support may be selected from those appropriately prepared, or from commercial products.

A thickness of the second support is appropriately selected depending on the intended purpose without any limitation, but it is preferably 25 μm to 100 μm, more preferably 25 μm to 50 μm. When the thickness thereof is less than 25 μm, an obtainable effect of preventing curl of the reversible thermosensitive recording medium may reduce. When the thickness thereof is greater than 100 µm, a total thickness of the reversible thermosensitive recording medium becomes large, which may impair flexibility thereof and may result poor usability.

—Laser Mark—

The laser mark is formed in a surface of the second support. The laser mark is consisted of a groove that forms a recess with respect to the thickness direction of the reversible thermosensitive recording medium, which is formed by melting a surface of the second support by heat of laser beams.

The present inventors have found new problems that, when an image is formed in a thermosensitive recording layer after forming a laser mark in a surface of a second support of the conventional reversible thermosensitive recording medium, missing image (white missing part) is left in an image, and a printing failure occurs in an area of the reversible thermosensitive recording layer, which is a corresponding area of an opposite side of the laser mark (may referred to as "a corresponding area of the reversible thermosensitive recording layer to a mark" hereinafter), and moreover, the white missing part becomes more significant after repeated use of the reversible thermosensitive recording medium. In the case where the reversible thermosensitive recording medium is used as work sheets, and instructions (e.g., a parts control manifest, and a process control manifest), the reversible thermosensitive recording medium needs to have flexibility. Specifically, a total thickness of the reversible thermosensitive recording medium needs to be small. However, the present inventors have further found that a white missing part is more likely to appear in the corresponding area of the reversible thermosensitive recording layer to the mark, as a total thickness of the reversible thermosensitive recording medium decreases.

To solve the aforementioned problems, the present inventors have conducted diligent researches, and accomplished a reversible thermosensitive recording medium, which has excellent printing quality without leaving a white missing part in a corresponding area of the reversible thermosensitive recording layer to the mark, can stably perform coloring and decoloring repeatedly, and has a mark of excellent visibility, regardless of repeated use of the reversible thermosensitive recording medium, and a total thickness of the reversible thermosensitive recording layer.

In the present invention, a length (depth) measured from a surface of the second support, and a bottom of the groove of the laser mark with respect to the thickness direction of the reversible thermosensitive recording medium is determined as a maximum depth A. A ratio of the maximum depth A to a total thickness of the reversible thermosensitive recording medium is 20% or less, preferably 2% to 20%, more preferably 4% to 20%, and even more preferably 6% to 20%.

When the ratio of the maximum depth A is greater than 20%, a white mixing part is formed in an area of the reversible thermosensitive recording layer corresponding to the area where the laser mark is formed, and such part may remain uncolored, as the reversible thermosensitive recording layer is colored in low temperature low humidity environments (e.g., temperature of 5° C., relative humidity of 30%). When the ratio of the maximum depth A is less than 2%, visibility of the laser mark may be poor. When the ratio of the maximum depth A is within the aforementioned more preferable range, conversely, printing quality is excellent without forming a white missing part in an area of the reversible thermosensitive recording layer corresponding to the area where the laser mark has been formed, and visibility of the laser mark is also excellent.

The ratio of the maximum depth A can be determined by the following equation 1.

$$A \text{ ratio of maximum depth } A\ (\%) = \text{maximum depth } A\ (\mu m)/\text{total thickness of reversible thermosensitive recording medium } (\mu m) \times 100 \quad \text{Equation 1}$$

For example, in the case where ten characters of number, from "0" to "9," are formed by laser marking, a point at which a length from a surface of the second support to a bottom of the groove of the laser mark with respect to the thickness direction of the reversible thermosensitive recording medium (may referred to as "depth of mark groove" hereinafter) takes the maximum value is a point (intersection) where lines are overlapped in the laser mark of the number "4" or "8." For example, in the case where the number "4" is formed by laser marking in the size that fits in a rectangle of 3.5 mm in length, and 2.5 mm in width, the deepest point of the point (intersection) at which the lines are overlapped in the laser mark of the number "4" is determined as a bottom of the groove, and a length (depth) from the bottom and a surface of the second support with respect to the thickness direction of the reversible thermosensitive recording medium is determined as a maximum depth A.

Note that, the definition of the maximum depth A has been explained taking the number "4" as an example, but an example thereof is not limited to the number "4" in the present invention, and a case of the number "8" is similarly defined. In the case where a plurality of characters, such as a number "4," a number "8," alphabet "f," and alphabet "t," are formed on the reversible thermosensitive recording medium by laser marking, and depths of the mark grooves at intersections in laser marks of these character are different, the depth of the mark groove for the character having the deepest depth of the mark groove is defined as a maximum depth A.

In the case where one character is formed on the reversible thermosensitive recording medium by laser marking, but such character has a plurality of intersections, such as a symbol "#," similarly to the case where a plurality of the characters are formed by laser marking, the depth of mark groove for the intersection having the deepest depth of mark groove is determined as a maximum depth A. Further, in the case where a plurality of characters each having a plurality of intersections, such as a symbol "#," a maximum depth A is defined in the same manner.

Figure 2:
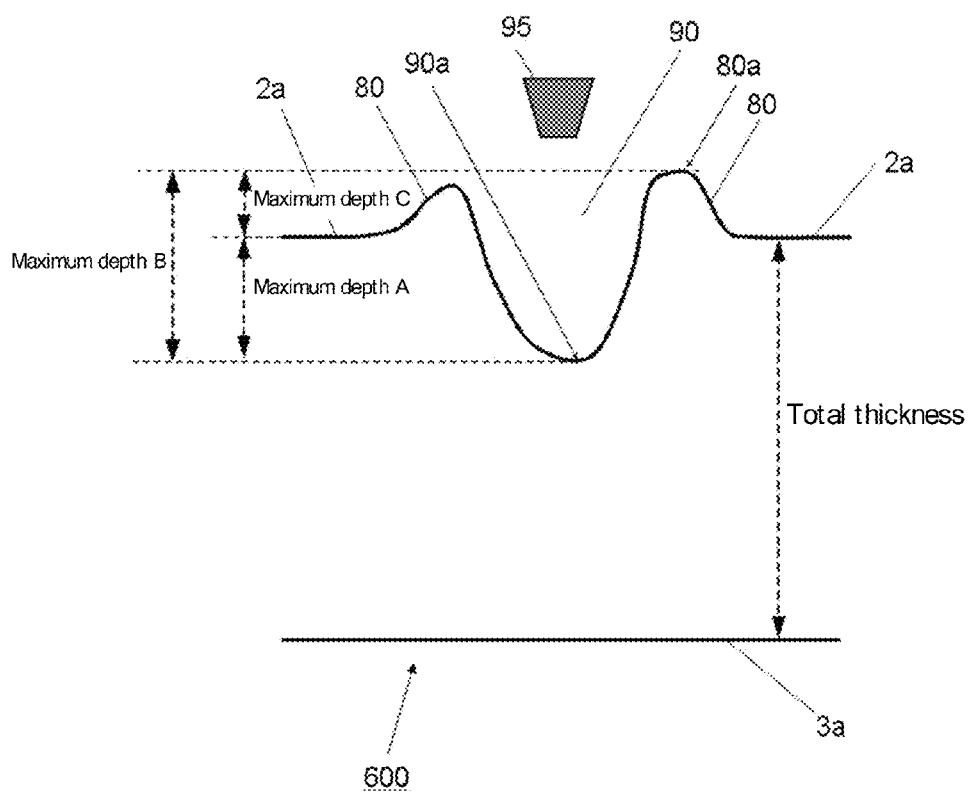
FIG. 2 is a schematic diagram of a cross-section at X-X' of FIG. 1.

Specific examples are depicted in FIG. 1 and FIG. 2. FIG. 1 is a diagram illustrating one example where a number "4" is formed on a surface of the second support by laser marking, and FIG. 2 is a schematic diagram illustrating a cross-section (a cross-section with respect to the thickness direction of the reversible thermosensitive recording medium 600) at X-X' of FIG. 1.

As depicted in FIG. 2, a groove of a laser mark is formed by applying laser to a surface 2a of a second support from a laser head 95, and in the groove 90, a length (depth of mark groove) from the point (an intersection in the laser mark, a number "4," depicted in FIG. 1) 90a at which the second support is engraved the deepest with respect to the thickness direction of the reversible thermosensitive recording medium 600 to the surface 2a of the second support with respect to the thickness direction of the reversible thermosensitive recording medium 600 is defined as a maximum depth A. Note that, in FIG. 2, a reference "3a" represents a surface of a reversible thermosensitive recording layer.

The maximum depth A can be measured, for example, by a digital microscope (VHX-1000, manufactured by KEYENCE CORPORATION).

Note that, the groove 90 of the laser mark is presented as an irregular shape in FIG. 2, but the shape thereof is not limited thereto and is appropriately selected depending on the intended purpose.

The maximum depth A is appropriately selected depending on a material of the second support without any limitation, provided that it satisfies the aforementioned ratio of the maximum depth A, but it is preferably greater than 5 µm, more preferably greater than 7 µm, and even more preferably greater than 13 pm, as excellent visibility can be attained.

Moreover, a width of the groove of the laser mark (length of the groove in the vertical direction with respect to the thickness direction of the reversible thermosensitive recording medium), that is a thickness of a line of a marked character, is appropriately selected depending on the intended purpose without any limitation.

The groove 90 of the laser mark is formed on the second support by melting the second support with heat of laser beams at the time of laser marking. The melted second support is accumulated at the boundary of the groove 90 of the laser mark to rise, to thereby forming a protrusion 80, which is projected with respect to the thickness direction of the reversible thermosensitive recording material, on the surface 2a of to the second support. In the case where a protrusion 80 formed by melting the second support along the boundary of the groove 90 of the laser mark on the surface 2a of the second support is present after laser marking in the manner as described, a length (may referred to as a "height of protrusion at mark boundary" hereinafter) from the surface 2a of the second support to an apex 80a of the protrusion 80 of the laser mark with respect to the thickness direction of the reversible thermosensitive recording medium is defined as a maximum depth C, and a sum of the maximum depth A and the maximum depth C, which is represented by (A+C), is defined as a maximum depth B. A ratio of the maximum depth B to a total thickness of the reversible thermosensitive recording medium is 23% or less, preferably 3% to 23%, and more preferably 6% to 23%.

When the ratio of the maximum depth B to the total thickness is greater than 23%, a white mixing part is formed in an area of the reversible thermosensitive recording layer corresponding to the area where the laser mark is formed, and such part may remain uncolored, as the reversible thermosensitive recording layer is colored in low temperature low humidity environments (e.g., temperature of 5° C., relative humidity of 30%). When the ratio of the maximum depth B is less than 3%, visibility of a laser mark may be poor. When the ratio of the maximum depth B is within the aforementioned more preferable range, conversely, printing quality is excellent without forming a white missing part in an area of the reversible thermosensitive recording layer corresponding to the area where the laser mark has been formed, and visibility of the laser mark is also excellent.

The ratio of the maximum depth B can be determined by the following equation 2.

Ratio of maximum depth $B$ (%)=maximum depth $B$ (µm)/total thickness of reversible thermosensitive recording medium (µm)×100        Equation 2

In the present invention, the maximum depth C is a length (height of protrusion at mark boundary) from the highest apex of a protrusion formed by melting the second support along the groove of the laser mark having the maximum depth A to the surface of the second support with respect to the thickness direction of the reversible thermosensitive recording medium. For example, in the case where a number "4" is formed by laser marking in a size that fits in a rectangle of 3.5 mm in length and 2.5 mm in width, a length from the highest apex of the protrusion formed along the bindery of the point (intersection) at which lines are overlapped in the number "4" of the laser mark to the surface of the second support with respect to the thickness direction of the reversible thermosensitive recording medium is defined as a maximum depth C.

In the present invention, moreover, the maximum depth B is a length (may referred to as a "depth from the protrusion to groove of the mark") that is a sum of the maximum depth C and the maximum depth A, represented by (A+C).

Note that, the definition of the maximum depth B is explained above taking the number "4" as an example, but examples are not limited thereto similarly to the case of the maximum depth A. In the case where a plurality of characters, such as a number "4," a number "8," an alphabet "f," and an alphabet "t" are formed on the reversible thermosensitive recording medium by laser marking, the case where a character having a plurality of intersections, such as a symbol "#," is formed, or the case where a plurality of characters each having a plurality of intersections, such as a symbol "#," are formed by laser marking, the depth from the protrusion to groove of the mark for the character or intersection having the deepest the depth from the protrusion to groove of the mark is determined as a maximum depth B.

A specific example will be depicted in FIGS. 1 and 2. As illustrated in FIG. 2, a laser mark is formed by applying laser beams to a surface 2a of the second support from a laser head 95, in the laser mark, a length (height of protrusion at mark boundary) from the highest point of the protrusion 80 at the boundary of the groove 90, that is an apex 80a of the protrusion, to the surface 2a of the second support with respect to the thickness direction of the reversible thermosensitive recording medium 600 is defined as a maximum depth C. Accordingly, a sum of the maximum depth A and the maximum depth C, represented by (A+C), is a maximum depth B.

The maximum depth C or maximum depth B can be measured, for example, by a digital microscope (VHX-1000, manufactured by KEYENCE CORPORATION).

Note that, the protrusion 80 depicted in FIG. 2 has an irregular shape, but the shape thereof is not limited thereto, and is appropriately selected depending on the intended purpose.

The maximum depth B is appropriately selected depending on a material of the second support without any limitation, provided that it satisfies the aforementioned ratio of the maximum depth B, but it is preferably greater than 5 µm, more preferably greater than 11 µm, and even more preferably greater than 19 µm, as excellent visibility is attained.

Moreover, a width of the protrusion at the boundary of the groove of the laser mark (a length of the protrusion in the vertical direction with respect to the thickness direction of the reversible thermosensitive recording medium) is appropriately selected depending on the intended purpose without any limitation.

The reversible thermosensitive recording medium of the present invention may satisfy only the ratio of the maximum depth A (20% or less), or may satisfy only the ratio of the maximum depth B (23% or less), or may satisfy both the ratio of the maximum depth A and the ratio of the maximum depth B (the ratio of the maximum depth A is 20% or less and the ratio of the maximum depth B is 23% or less).

The laser mark is appropriately selected depending on use of the is reversible thermosensitive recording medium, and examples thereof include printed characters, such as a production date, and production lot number of the reversible thermosensitive recording medium. The printed character is appropriately selected depending on the intended purpose without any limitation, and examples thereof include numbers, alphanumerics, alphabets, and symbols.

A type of laser used for performing the laser marking is appropriately selected depending on the intended purpose without any limitation, and examples thereof include carbon dioxide laser, excimer laser, and YAG laser.

The laser energy for performing the laser marking is appropriately selected depending on the intended purpose without any limitation. Since thermal energy applying to a subject (a second support) varies with the same laser output (W), depending on a type of laser and linear velocity thereof, energy density of the laser is important.

The energy density of the laser marking is appropriately selected depending on the intended purpose without any limitation, provided that the aforementioned ratio of the maximum depth A and/or the ratio of the maximum depth B can be realized, but it is preferably 0.0142 W/(mm/s) or lower, more preferably greater than 0.009 W/(mm/s) but 0.0142 W/(mm/s) or lower, and even more preferably 0.0097 W/(mm/s) to 0.0142 W/(mm/s). When the energy density is greater than 0.0142 W/(mm/s), a white mixing part is formed in an area of the reversible thermosensitive recording layer corresponding to the area where the laser mark is formed, and such part may remain uncolored, as the reversible thermosensitive recording layer is colored in low temperature low humidity environments (e.g., temperature of 5° C., relative humidity of 30%). When the energy density is within the aforementioned even more preferably range, conversely, printing quality is excellent without forming a white missing part in an area of the reversible thermosensitive recording layer corresponding to the area where the laser mark has been formed, and visibility of the laser mark is also excellent.

A position in the second support at which the laser mark is formed is appropriately selected depending on the intended purpose without any limitation, provided that it is in a surface of the second support. In the case where the maximum depth A reaches an electronic information recording module, it is preferred that a region which does not include the electronic information recording module be selected and laser marking be performed in the selected region.

<<Electronic Information Recording Module>>

The electronic information recording module is appropriately selected depending on the intended purpose without any limitation, provided that it can record electronic intelligence, but the electronic information recording module preferably contains a module board, and an electronic information recording element and an antenna circuit disposed on the module board. A location where the electronic information recording module is provided is appropriately selected depending on the intended purpose without any limitation, but it is preferably accommodated in the first support. In this case, the electronic information recording module may be covered with the adhesive together with the first support.

—Electronic Information Recording Element—

The electronic information recording element is also referred to as an "IC chip," "IC chip module," or "IC package."

A thickness (height) of the electronic information recording element is appropriately selected depending on the intended purpose without any limitation, but it is preferably 200 μm or less, more preferably 25 μm to 150 μm.

—Antenna Circuit—

A method for forming the antenna circuit is appropriately selected depending on the intended purpose without any limitation, and examples thereof include: a method for etching a metal film laminated on the module board; a method for repeatedly winding a coated electric wire (enameled wire) on a same plane; a method for printing so-called an electric conductive paste on the module board; a method for embedding the antenna circuit in the module board; and a method for laminating a metal leaf as the antenna circuit.

A shape of the antenna circuit is appropriately selected depending on the intended purpose without any limitation, but it is typically that a thickness of the wiring part of the antenna circuit is 5 μm to 30 μm, and the antenna circuit has a convexoconcave shape corresponding to a presence and absence of the wiring. When the thickness thereof is greater than 30 μm, printing defects, such as white missing parts formed in an image or blurring, may formed in the reversible thermosensitive recording layer.

—Module Board—

A base material used for the module board is appropriately selected depending on the intended purpose without any limitation, and examples thereof include: rigid materials such as paper phenol, glass epoxy, and a composite; flexible materials such as polyimide, polyester, polypropylene, polyethylene, polystyrene, nylon, polyethylene terephthalate (PET), paper, and synthetic paper; composite materials of the foregoing materials.

A thickness of the module board is appropriately selected depending on the intended purpose without any limitation, but it is preferably 15 μm to 100 μm to make the reversible thermosensitive recording medium thin for improving flexibility thereof.

In the case where, for example, a metal leaf is laminated to the module board as the antenna circuit, the metal leaf is appropriately selected depending on the intended purpose without any limitation, and examples thereof include copper leaf, aluminum leaf, and iron leaf. Among them, the aluminum leaf is preferable as it is excellent in cost efficiency and processability. A thickness of the metal leaf is appropriately selected depending on the intended purpose without any limitation, but it is preferably 5 μm to 50 μm.

A shape of the module board is not particularly limited, and examples thereof include a square, rectangle, circle, and oval.

The electronic information recording module is callable of receiving electric waves of certain frequencies, and also is capable of sending back information of the electronic information recording element to an emission source. The electric waves of certain frequencies are typically appropriately selected from frequencies used for communication, such as 125 kHz, 13.56 MHz, 2.45 GHz, 5.8 GHz (microwaves), and an ultra high frequency (UHF) band.

As for the electronic information recording module, a commercial product thereof can be used. Specific examples of the commercial product thereof include inlet sheets available from Avery Dennison Japan K.K., UPM-Kymmene Japan K.K., OMRON Corporation, Alien Technology Corporation, Sony Corporation, FUJITSU LIMITED, Hitachi Corporation, Texas Instruments Incorporated, Fujii & Co., Ltd., Dai Nippon Printing Co., Ltd., and TOPPAN PRINTING CO., LTD.

<<First Support>>

The first support is preferably covered with the adhesive and is preferably provided between the second support and the reversible thermosensitive recording layer.

The first support preferably has a portion for accommodating the electronic information recording module, and the portion for accommodating is preferably a recess (may referred to as a "recess for accommodating an electronic information recording module" hereinafter) that sets back with respect to the thickness direction of the first support.

A shape, structure and size of the first support are appropriately selected depending on the intended purpose without any limitation. Examples of the shape include a square and a circle. The structure thereof is preferably a sheet structure, and examples thereof include a single layer structure and a laminate structure. The size thereof is appropriately selected depending on a use thereof.

A material of the first support is appropriately selected depending on the intended purpose without any limitation, and examples thereof include a resin, rubber, synthetic paper, metal, glass, and a combination thereof. Among them a resin is particularly preferable.

The resin is appropriately selected depending on the intended purpose without any limitation, and examples thereof include polyethylene terephthalate (PET), polycarbonate, polystyrene, and polymethyl methactylate. These may be used independently, or in combination. Among them, polyethylene terephthalate is particularly preferable.

The first support may be selected from those appropriately prepared, or selected from commercial products.

A thickness of the first support is appropriately selected depending on the intended purpose without any limitation. When the aforementioned recess for accommodating an electronic information recording module is formed in the first support in a manner that a projected electronic information recording module can be inserted therein, the thickness of the first support is selected taking the recess for accommodating an electronic information recording module into consideration and is preferably 20 μm to 300 μm, more preferably 100 μm to 250 μm.

—Recess for Accommodating Electronic Information Recording Module—

A shape of the recess for accommodating an electronic information recording module is appropriately selected depending on the intended purpose without any limitation, but a depth of the recess (length of the recess for accommodating an electronic information recording module with respect to the thickness direction of the reversible thermosensitive recording medium) is preferably 10 μm to 260 μm. When the recess for accommodating an electronic information recording module has the aforementioned shape, an electronic information recording element of an electronic information recording module is prevented from being projected with respect to the thickness direction of the reversible thermosensitive recording medium, and therefore excellent printing quality can be attained without missing images or blurring in the reversible thermosensitive recording layer.

Moreover, a distance between the recess for accommodating an electronic information recording module and the electronic information recording element in the width direction of the recess for accommodating an electronic information recording module (the vertical direction with respect to the thickness direction of the reversible thermosensitive recording layer) is appropriately selected depending on the intended purpose without any limitation, but it is preferably 2 mm to 10 mm. When the distance between the recess and the electronic information recording element in the width direction of the recess for accommodating an electronic information recording module is greater than 10 mm, a white mixing part may formed, or blurring may occurred in an image of the reversible thermosensitive recording layer.

A distance between the recess for accommodating an electronic information recording module and the electronic information recording element in the depth direction of the recess for accommodating an electronic information recording module (thickness direction of the reversible thermosensitive recording layer) is appropriately selected depending on the intended purpose without any limitation, but it is preferably 10 μm to 50 μm, more preferably 15 μm to 45 μm. When the distance between the recess for accommodating an electronic information recording module and the electronic information recording element in the depth direction of the recess for accommodating an electronic information recording module is smaller than 10 μm, the electronic information recording element may be projected to the side of the first support, to thereby causing a coloring failure in the surrounding area of the electronic information recording element. When it is greater than 50 μm, the surface of the first support above the electronic information recording element may be sunk, which may cause a coloring failure in a region of the electronic information recording element. When the distance thereof is within the aforementioned preferable range, conversely, formation of white missing parts in an image of the reversible thermosensitive recording layer can be prevented.

A method for forming the recess for accommodating an electronic information recording module is appropriately selected depending on the intended purpose without any limitation, but it is preferably cutting, laser-beam machining, press working, or etching. In accordance with any of these formation methods of the recess, the recess for accommodating an electronic information recording module can be formed with high accuracy to the intended size.

<<Adhesive>>

The adhesive is used to over the first support, and preferably bonds the first support and the second support together. The adhesive may be provided in the form of a layer between the first support and the second support.

The adhesive is appropriately selected depending on the intended purpose without any limitation, and examples thereof include a thermoplastic resin, a thermoset resin, a moisture curing resin, and a UV curing resin, where these resins are specifically such as a urea resin, a melamine resin, a phenol resin, an epoxy resin, a vinyl acetate resin, a vinyl acetate-acryl copolymer, an ethylene-vinyl acetate copolymer, an acrylic resin, a polyvinyl ether resin, a vinyl chloride-vinyl acetate copolymer, a polystyrene resin, a polyester resin, a polyurethane resin, a polyamide resin, a chlorinated polyolefin resin, a polyvinyl butyral resin, an acrylic ester copolymer, a methacrylic ester copolymer, natural rubber, synthetic rubber, a cyanoacrylate resin, a silicone resin, and a styrene-isoprene-styrene block copolymer. These may be used independently, or in combination.

Among them, as for the adhesive, natural rubber, synthetic rubber, an acrylic resin, a silicone resin, a polyurethane resin, a styrene-isoprene-styrene block copolymer, and an ethylene-vinyl acetate copolymer are preferable, and a polyurethane resin is particularly preferable.

In the case where the adhesive is provided in the form of a layer (which may be referred to as an "adhesive layer" hereinafter), a thickness of the adhesive layer is appropriately selected depending on the intended purpose without any limitation, but it is preferably adjusted so that the minimum distance between the antenna circuit and the first support is 10 μm or greater, more preferably 20 μm or greater. When the minimum distance is less than 10 μm, a convexconcave shape of the antenna circuit may cause coloring failures, such as white missing part in an image or blurring during an image formation on the reversible thermosensitive recording layer.

Note that, the convexconcave shape of the antenna circuit can be absorbed by the adhesive when the aforementioned minimum distance is 20 μm, but the minimum distance of larger than 20 μm increases a total thickness of the reversible thermosensitive recording medium, which may inhibit providing sufficient flexibility to the reversible thermosensitive recording medium. Accordingly, the upper limit of the minimum distance is preferably 50 μm or smaller.

In the present specification, the term "minimum distance" refers to a distance (distance with respect to the thickness direction of the reversible thermosensitive recording medium) between the first support and the upper surface of the wiring part of the antenna circuit, a position of which is the closest to the first support.

The minimum distance can be measured by cut out and polish a cross-section of the reversible thermosensitive recording medium adjacent to the wiring part of the antenna circuit, and observing the cross-sectional shape of the reversible thermosensitive recording medium.

A thickness of the adhesive layer is appropriately selected depending on the intended purpose without any limitation, but it is preferably adjusted taking the aforementioned minimum distance into consideration, and is preferably 300 μm or less, more preferably 250 μm or less, and even more preferably 200 μm or less.

A method for forming the adhesive layer is appropriately selected depending on the intended purpose without any limitation, and examples thereof include spin coating, spray coating, laminating, and roller coating. Among them, roller coating is preferable as it can form an adhesive layer with a uniform thickness.

<Reversible Thermosensitive Recording Layer>

The reversible thermosensitive recording layer is a layer provided on the base, and is preferably provided on the first support.

The reversible thermosensitive recording layer is a thermosensitive recording layer whose color tone reversibly changes, and contains a reversible thermosensitive recording material whose color changes reversibly corresponding to temperature change. The reversible thermosensitive recording material changes its color condition by a combination with a change in transmittance, reflectance, absorption wavelength, or a scattering degree.

The reversible thermosensitive recording material is appropriately selected depending on the intended purpose without any limitation, provided that it is a material whose transparency or color tone reversibly changes with heat, and examples thereof include a material that materials that turn into a state of a first color at first temperature, which is higher than atmospheric temperature, and turn into a state of a second color by heating to second temperature, which is higher than the first temperature, followed by cooling. Among them, materials whose color changes between at the first temperature and at the second temperature are particularly preferable.

Specific examples thereof include: a material that is transparent at the first temperature and is clouded at the second temperature (see, for example, JP-A No. 55-154198); a material that colors at the second temperature and decolored at the first temperature (see, for example, JP-A Nos. 04-224996, 04-247985, and 04-267190); a material that is clouded at the first temperature and is transparent at the second temperature (see, for example, JP-A No. 03-169590); and a material that colors in black, red, or blue at the first temperature, and decolored at the second temperature (see, for example, JP-A Nos. 02-188293, and 02-188294). These materials may be used independently, or in combination. Among them, a material in which an organic low molecular material (e.g., higher fatty acid) is dispersed in a resin base, and a material containing an electron-donating color-forming compound (coloring agent) and an electron-accepting compound (developing agent) are particularly preferable.

<<Electron-Donating Color-Forming Compound>>

The electron-donating color-forming compound (coloring agent) is appropriately selected depending on the intended purpose without any limitation, and examples thereof include a colorless, or pale color dye precursor (leuco dye). Examples of the leuco dye include a fluoran compound, a phthalide compound, and an azaphthalide compound. These may be used independently, or in combination.

Specific examples of the fluoran compound include 2-anilino-3-methyl-6-dibutylaminofluoran, 2-anilino-3-methyl-6-diethylaminofluoran, 2-anilino-3-methyl-6-di(n-butylamino)fluoran, 2-anilino-3-methyl-6-(N-n-propyl-N-methylamino)fluoran, 2-anilino-3-methyl-6-(N-isopropyl-N-methylamino)fluoran, 2-anilino-3-methyl-6-(N-isobutyl-N-methylamino)fluoran, 2-anilino-3-methyl-6-(N-n-amyl-N-methylamino)fluoran, 2-anilino-3-methyl-6-(N-sec-butyl-N-methylamino)fluoran, 2-anilino-3-methyl-6-(N-n-amyl-N-ethylamino)fluoran, 2-anilino-3-methyl-6-(N-iso-amyl-N-ethylamino)fluoran, 2-anilino-3-methyl-6-(N-n-propyl-N-isopropylamino)fluoran, 2-anilino-3-methyl-6-(N-cyclohexyl-N-methylamino)fluoran, 2-anilino-3-methyl-6-(N-ethyl-p-toluidino)fluoran, 2-anilino-3-methyl-6-(N-methyl-p-toluidino)fluoran, 2-(m-trichloromethylanilino)-3-methyl-6-diethylaminofluoran, 2-(m-trifluoromethylanilino)-3-methyl-6-diethylaminofluoran, 2-(m-trichloromethylamino)-3-methyl-6-(N-cyclohexyl-N-methylamino)fluoran, 2-(2,4-dimethylanilino)-3-methyl-6-diethylaminofluoran, 2-(N-ethyl-p-toluidino)-3-methyl-6-(N-ethylanilino)fluoran, 2-(N-ethyl-p-toluidino)-3-methyl-6-(N-propyl-p-toluidino)fluoran, 2-anilino-6-(N-n-hexyl-N-ethylamino)fluoran, 2-(o-chloroanilino)-6-diethylaminofluoran, 2-(o-choroanilino)-6-dibutylaminofluoran, 2-(m-trifluoromethylanilino)-6-diethylaminofluoran, 2,3-dimethyl-6-dimethylaminofluoran, 3-methyl-6-(N-ethyl-p-toluidino)fluoran, 2-chloro-6-diethylaminofluoran, 2-bromo-6-diethylaminofluoran, 2-chloro-6-dipropylaminofluoran, 3-chloro-6-cyclohexylaminofluoran, 3-bromo-6-cyclohexylaminofluoran, 2-chloro-6-(N-ethyl-N-isoamylamino)fluoran, 2-chloro-3-methyl-6-diethylaminofluoran, 2-anilino-3-chloro-6-diethylaminofluoran, 2-(o-chloroanilino)-3-chloro-6-cyclohexylaminofluoran, 2-(m-trifluoromethylanilino)-3-chloro-6-diethylaminofluoran, 2-(2,3-dichloroanilino)-3-chloro-6-diethylaminofluoran, 1,2-benzo-6-diethylaminofluoran, and 3-diethylamino-6-(m-trifluoromethylanilino)fluoran.

Specific examples of the azaphthalide compound include 3-(1-ethyl-2-methylindol-3-yl)-3-(2-ethoxy-4-diethylaminophenyl)-4-azaphthalide, 3-(1-ethyl-2-methylindol-3-yl)-3-(2-ethoxy-4-diethylaminophenyl)-7-azaphthalide, 3-(1-octy-2-methylindol-3-yl)-3-(2-ethoxy-4-diethylaminophenyl)-4-azaphthalide, 3-(1-ethyl-2-methylindol-3-yl)-3-(2-methyl-4-diethylaminophenyl)-4-azaphthalide, 3-(1-ethyl-2-methylindol-3-yl)-3-(2-methyl-4-diethylaminophenyl)-7-azaphthalide, 3-(1-ethyl-2-methylindol-3-yl)-3-(4-diethylaminophenyl)-4-azaphthalide, 3-(1-ethyl-2-methylindol-3-yl)-3-(4-N-n-amyl-N-methylaminophenyl)-4-azaphthalide, 3-(1-methyl-2-methylindol-3-yl)-3-(2-hexyloxy-4-diethylaminophenyl)-4-azaphthalide, 3,3-bis(2-ethoxy-4-diethylaminophenyl)-4-azaphthalide, and 3,3-bis(2-ethoxy-4-diethylaminophenyl)-7-azaphthalide.

Examples of other coloring agents include 2-(p-acetylanilino)-6-(N-n-amyl-N-n-butylamino)fluoran, 2-benzylamino-6-(N-ethyl-p-toluidino)fluoran, 2-benzylamino-6-(N-methyl-2,4-dimethylanilino)fluoran, 2-benzylamino-6-(N-ethyl-2,4-dimethylanilino)fluoran, 2-benzylamino-6-(N-methyl-p-toluidino)fluoran, 2-benzylamino-(6-(N-ethyl-p-toluidino)fluoran, 2-(di-p-methylbenzylamino)-6-(N-ethyl-p-toluidino)fluoran, 2-(o-phenylethylamino)-6-(N-ethyl-p-toluidino)fluoran, 2-methylamino-6-(N-methylanilino)fluoran, 2-methylamino-6-(N-ethylanilino)fluoran, 2-methylamino-6-(N-propylanilino)fluoran, 2-ethylamino-6-(N-methyl-p-toluidino)fluoran, 2-methylamino-6-(N-methyl-2,4-dimethylanilino)fluoran, 2-ethylamino-6-(N-ethyl-2,4-dimethylanilino)fluoran, 2-dimethylamino-6-(N-methylanilino)fluoran, 2-dimethylamino-6-(N-ethylanilino)fluoran, 2-diethylamino-6-(N-methyl-p-toluidino)fluoran, 2-diethylamino-6-(N-ethyl-p-toluidino)fluoran, 2-dipropylamino-6-(N-methylanilino)fluoran, 2-dipropylamino-6-(N-ethylanilino)fluoran, 2-amino-6-(N-methylanilino)fluoran, 2-amino-6-(N-ethylanilino)fluoran, 2-amino-6-(N-propylanilino)fluoran, 2-amino-6-(N-methyl-p-toluidino)fluoran, 2-amino-6-(N-ethyl-p-toluidino)fluoran, 2-amino-6-(N-propyl-p-toluidino)fluoran, 2-amino-6-(N-methyl-p-ethylanilino)fluoran, 2-amino-6-(N-ethyl-p-ethylanilino)fluoran, 2-amino-6-(N-propyl-p-ethylanilino)fluoran, 2-amino-6-(N-methyl-2,4-dimethylanilino)fluoran, 2-amino-6-(N-ethyl-2,4-dimethylanilino)fluoran, 2-amino-6-(N-propyl-2,4-dimethylanilino)fluoran, 2-amino-6-(N-methyl-p-chloroanilino)fluoran, 2-amino-6-(N-ethyl-p-chloroanilino)fluoran, 2-amino-6-(N-propyl-p-chloroanilino)fluoran, 1,2-benzo-6-(N-ethyl-N-isoamylamino)fluoran, 1,2-benzo-6-dibutylaminofluoran, 1,2-benzo-6-(N-methyl-N-cyclohexylamino)fluoran, and 1,2-benzo-6-(N-ethyl-N-toluidino)fluoran.

<<Electron-Accepting Compound>>

The electron-accepting compound (developing agent) is a compound having, in a molecular structure thereof, a structure capable of developing a color of the electron-donating color-forming compound (e.g., a phenolic hydroxyl group, a carboxylic acid group, and a phosphoric acid group), and at least one structure for controlling cohesion between molecules (e.g., a structure coupled with a long linear hydrocarbon group). These structures may be coupled via a bivalent or higher linking group containing a hetero atom. Moreover, the long linear hydrocarbon group may contain a similar linking group and/or an aromatic group.

The electron-accepting compound is appropriately selected depending on the intended purpose without any limitation, and examples thereof include those disclosed in JP-A Nos. 05-124360, 06-210954, and 10-95175. These may be used independently, or in combination.

Specific examples of such developing agents include those disclosed in JP-A Nos. 09-290563 and 11-188969. Among them, at least one selected from the group consisting of compounds represented by the following general formula 1 and compounds represented by the following general formula 2 are preferable. Since these developing agents have extremely high sensitivity, applied energy can be reduced by about 10% to about 30% compared to conventional developing agents, for outputting an image with a same level of image density. When the applied energy is small, thermal decomposition of the developing agent reduces, and damage given to a surface of the reversible thermosensitive recording medium and to the reversible thermosensitive recording medium itself is reduced. As a result, deterioration in durability of the reversible thermosensitive recording medium with repetitive use is reduced.

Accordingly, image quality of the reversible thermosensitive recording medium can be improved.

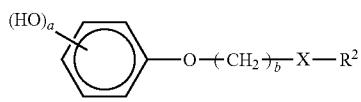

General Formula 1

In the general formula 1, X is a bivalent organic group containing a hetero atom; $R^2$ is a substituted or unsubstituted monovalent hydrocarbon group; a is an integer of 1 to 3; and b is an integer of 1 to 20.

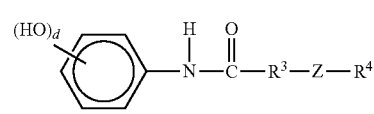

General Formula 2

In the general formula 2, Z is a bivalent organic group containing a hetero atom; $R^3$ is a substituted or unsubstituted bivalent hydrocarbon group; $R^4$ is a substituted or unsubstituted monovalent hydrocarbon group; and d is an integer of 1 to 3.

In the general formulae 1 and 2, X and Z each independently represent a bivalent organic group containing a hetero atom, but preferably a bivalent organic group containing a nitrogen atom or oxygen atom. Examples thereof include a bivalent organic group containing at least one selected from the group consisting of groups represented by the following structural formulae.

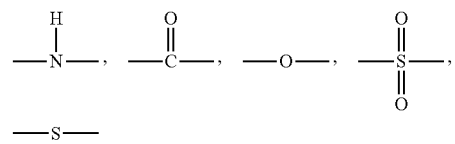

Preferable specific examples of the bivalent organic group containing a hetero atom include groups represented by the following structural formulae.

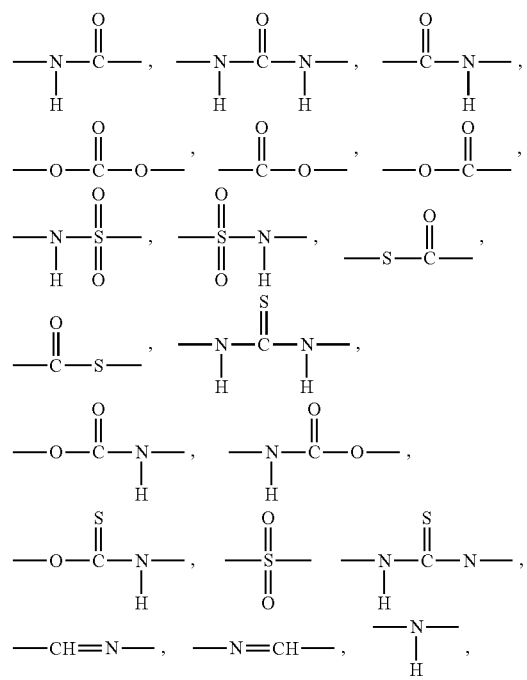

-continued

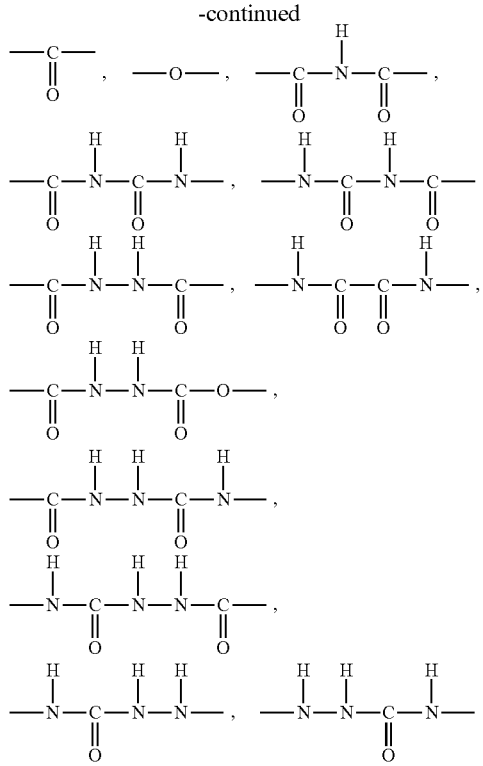

Among them, the groups represented by the following structural formulae are particularly preferable as the bivalent organic group containing a hetero atom.

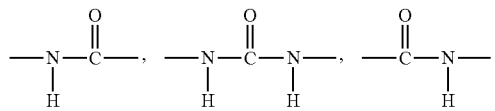

In the general formula 2, $R^3$ represents a substituted or unsubstituted C1-C20 bivalent hydrocarbon group, but it is preferably selected from those represented by the following general formulae.

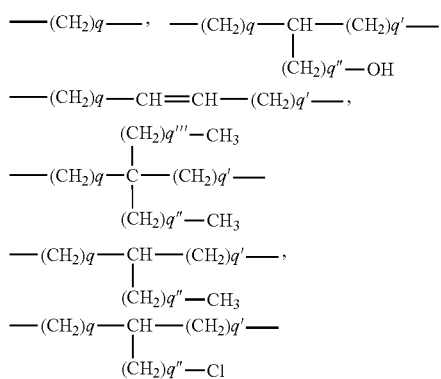

In the general formulae above, q, q', q", and q''' are each an integer that satisfies the number of carbon atoms of $R^3$. Among them, —$(CH_2)_q$— is particularly preferable.

In the general formulae 1 and 2, $R^2$ and $R^4$ are each independently a substituted or unsubstituted C1-C24 aliphatic hydrocarbon group, and the number of carbon atoms in the group is preferably 8 to 18.

The aliphatic hydrocarbon group may be a linear chain structure or a blanched chain structure, and may contain a unsaturated bond. A substituent bonded to the hydrocarbon group by substitution is appropriately selected depending on the intended purpose without any limitation, and examples thereof include a hydroxyl group, a halogen atom, and an alkoxy group. Note that, the number of carbon atoms of $R^2$, or a sum of the numbers of carbon atoms of $R^3$ and $R^4$ is preferably 8 or greater, more preferable 11 or greater, as stability of coloring ability, and decoloring performance reduces when the number thereof is 7 or less.

Preferable examples of $R^2$ and $R^4$ include those represented by the following general formulae.

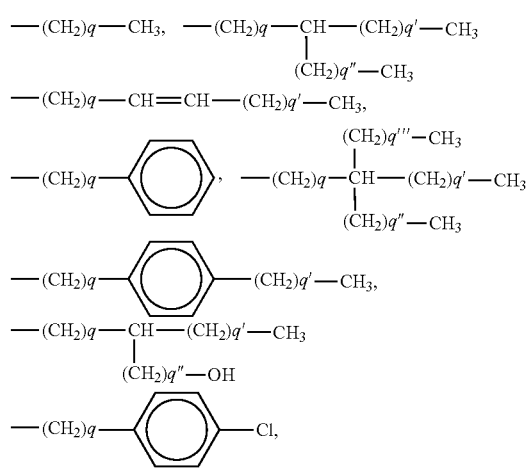

In the general formulae above, q, q', q", and q''' are each independently an integer that satisfies the number of carbon atoms of $R^2$ or $R^4$. Among them, —$(CH_2)_q$—$CH_3$ is particularly preferable.

<<Additives>>

The reversible thermosensitive recording layer may further contain additives, if necessary, for improving or controlling coating properties, and coloring and decoloring properties. The additives are appropriately selected depending on the intended purpose without any limitation, and examples thereof include a surfactant, an electric conductive agent, filler, an antioxidant, a coloring stabilizer, and a decoloring accelerator. These may be used independently, or in combination.

<<Binder Resin>>

The reversible thermosensitive recording layer contains the electron-donating color-forming compound, and the electron-accepting compound, and preferably further contains the aforementioned additives together with a binder resin, if necessary.

The binder resin is appropriately selected depending on the intended purpose without any limitation, provided that it can bond the aforementioned materials of the reversible thermosensitive recording layer onto the first support. Among them, the binder resin is preferably a resin cured by heat, ultraviolet (UV) rays, or electron beams (EB), and more preferably a resin which is thermally cured using a curing agent, in order to improve durability against repeated image formations. Use of such binder resin can improve gel fraction. These may be used independently, or in combination.

The thermally curable resin is appropriately selected depending on the intended purpose without any limitation, and examples thereof include an acryl polyol resin, a polyester polyol resin, a polyurethane polyol resin, a polyvinyl butyral resin, cellulose acetate propionate, and cellulose acetate butylate.

The curing agent is appropriately selected depending on the intended purpose without any limitation, but it is preferably isocyanate. Examples of the isocyanate include: hexamethylene diisocyanate (HDI), tolylene diisocyanate (TDI), xylylene diisocyanate (XDI), and isophorone diisocyanate (IPDI); and adducts of the foregoing isocyanates, such as with trimethylol propane, biurets of the foregoing isocianates, isocyanurates of the foregoing isocianates, and blocked isocyanates of the foregoing isocyanate. These may be used independently, or in combination.

Among them, hexamethylene diisocyanate, adducts thereof, biurets thereof, and isocyanurate thereof are preferable. Nevertheless, a whole amount of the curing agent may not contribute to a curing reaction. Specifically, a non-reacted curing agent may be present in the reversible thermosensitive recording layer. To accelerate a curing reaction, a curing catalyst may be used.

A gel fraction of the reversible thermosensitive recording layer is appropriately selected depending on the intended purpose without any limitation, but it is preferably 30% or greater, more preferably 50% or greater, and even more preferably 70% or greater. When the gel fraction thereof is less than 30%, the reversible thermosensitive recording layer may have low durability after use of repeated image formations.

The gel fraction can be measured by immersing a coating film in a solvent having a high solubility. Specifically, it is measured in the following manner. First, the reversible thermosensitive recording layer is peeled from the first support, and an initial mass of the reversible thermosensitive recording layer is measured. Next, the reversible thermosensitive recording layer is sandwiched with a pair of 400-mesh wire gauzes and immersed in a solvent capable of dissolving an uncured binder resin for 24 hours, followed by vacuum drying. After drying, the mass is measured. From these values as measured, the gel fraction can be determined by the following equation 3.

$$\text{Gel fraction (\%)} = \text{mass after drying/initial mass} \times 100 \quad \text{Equation 3}$$

Here, calculation is carried out by deducting a mass of components (e.g., particles of an organic low molecular material) in the reversible thermosensitive recording layer exclusive of the binder resin. In the case where the mass of the particles of the organic low molecular material is not known in advance, the mass thereof can be determined by observing a cross-section of the reversible thermosensitive recording layer under a transmission electron microscope (TEM), or scanning electron microscope (SEM), determining a mass ratio based on a ratio of the area occupying per unit area, and specific gravities of the binder resin and the particles of the organic low molecular material to thereby calculate a mass of the particles of the organic low molecular material.

A mass ratio of the binder resin to the electron-donating color-forming compound (coloring agent), which is represented by (binder resin/electron-donating color-forming compound), is appropriately selected depending on the intended purpose without any limitation, but it is preferably 0.1 to 10. When the mass ratio is less than 0.1, thermal resistant of the reversible thermosensitive recording layer may be insufficient. When it is greater than 10, the color optical density may decrease.

A method for forming the reversible thermosensitive recording layer is appropriately selected from conventional methods depending on the intended purpose without any limitation, and examples thereof include a method where materials of a reversible thermosensitive recording layer, that is, the electron-donating color-forming compound and the electron-accepting compound, optionally the additives, and the binder resin, are uniformly dispersed in a solvent to prepare a coating liquid, and the coating liquid is applied to form a reversible thermosensitive recording layer.

The solvent in the coating liquid is appropriately selected depending on the intended purpose without any limitation, and examples thereof include alcohol, ketone, ether, glycol ether, ester, aromatic hydrocarbon, and aliphatic hydrocarbon. These may be used independently, or in combination.

A method for preparing the coating liquid is appropriately selected depending on the intended purpose without any limitation, and examples thereof include a method for preparing using a disperser, such as a paint shaker, a ball mill, an attritor, a tree-roll mill, a KEDY mill, a sand mill, a DYNO MILL, and a colloid mill. Each material may be added to and dispersed in a solvent by means of the disperser, or a dispersion in which each material is dispersed may be mixed. Further, each material may be heated and dissolved, followed by quenching or slow cooling, to precipitate a material.

A method for applying the coating liquid is appropriately selected depending on the intended purpose without any limitation, and examples thereof include blade coating, wire-bar coating, spray coating, air-knife coating, bead coating, curtain coating, gravure coating, reverse gravure kiss coating, reverse roller coating, dip coating, and die coating.

A thickness of the reversible thermosensitive recording layer is appropriately selected depending on the intended purpose without any limitation, preferably 1 µm to 20 µm, more preferably 3 µm to 15 µm. When the thickness thereof is smaller than 1 µm, color optical density reduces, which may lead to low contrast of an image. When the thickness thereof is greater than 20 µm, a thermal distribution of the reversible thermosensitive recording layer enhanced, which may cause a part where coloring does not occur as the temperature does not reach color developing temperature, and therefore intended color optical density may not be attained easily.

<Other Layers>

Other layers are is appropriately selected depending on the intended purpose without any limitation, and examples thereof include a back layer, a protective layer, an intermediate layer, and an under layer.

<<Back Layer>>

The back layer is a layer provided on a surface of the second support (an opposite surface of the second support to the surface thereof on which the adhesive is provided). Providing the back layer in the reversible thermosensitive recording medium is preferable, as curling of the reversible thermosensitive recording medium can be prevented.

Materials of the back layer are appropriately selected depending on the intended purpose without any limitation, and examples thereof include resins cured by heat, ultraviolet rays, or electron beams, preferably cured by ultraviolet rays. These may be used independently, or in combination.

The resin curable by heat, ultraviolet rays, or electron beams is, for example, selected from those described as the binder resin in the reversible thermosensitive recording layer, and a curing method thereof is also as described as the curing method for the binder resin in the reversible thermosensitive recording layer.

Moreover, the back layer may further contain, other than the aforementioned resin, organic filler, inorganic filler, a lubricant, a color pigment, an antistatic agent, and an UV absorber. These may be used independently, or in combination.

Examples of the organic filler include a silicone resin, a cellulose resin, an epoxy resin, a nylon resin, a phenol resin, a polyurethane resin, a urea resin, a melamine resin, polyester, polycarbonate, a styrene resin, an acrylic resin, polyethylene, a formaldehyde resin, and polymethyl methacrylate.

Examples of the inorganic filler include silica, alumina, carbonate, silicate, metal oxide, and a sulfuric acid compound.

Examples of the lubricant include synthetic wax, vegetable wax, animal wax, higher alcohol, higher fatty acid, higher fatty acid ester, and amide.

Examples of the UV absorber include compounds having a salicylate structure, a cyanoacrylate structure, a benzotriazol structure, or a benzophenone structure.

The back layer can be formed in the same methods as the formation method of the reversible thermosensitive recording layer. In the course of formation of the back layer, it is preferred that the back layer be coated so that the plane of the reversible thermosensitive recording medium, at which the reversible thermosensitive recording layer is provided, and the plane thereof, at which the back layer is provided, take a balance in terms of shrinkage. As a result, the reversible thermosensitive reversible medium can be made flat after all of the layers of the reversible thermosensitive recording medium are applied.

A thickness of the back layer is appropriately selected depending on the intended purpose without any limitation, but it is preferably 0.1 μm to 10 μm.

<<Protective Layer>>

The protective layer is a layer provided on a surface of the reversible thermosensitive recording layer. The protective layer is preferably provided to the reversible thermosensitive recording medium, as it can protect the reversible thermosensitive recording layer.

A material of the protective layer is appropriately selected depending on the intended purpose without any limitation, and for example, it is selected from resins cured by heat, ultraviolet rays, or electron beams, preferably resins cured by ultraviolet rays. These may be used independently, or in combination.

Examples of the resin curably by ultraviolet rays (electron beams) include: oligomers such as a urethane acrylate resin, an epoxy acrylate resin, a polyesteracrylate resin, a polyetheracrylate resin, a vinyl resin, and an unsaturated polyester resin; various monofunctional or polyfunctional monomers such as acrylate, methacrylate, vinyl ester, ethylene derivatives, and an allyl compound.

In the case where the resin is cured by ultraviolet rays, a photopolymerization initiator and photopolymerization accelerator are preferably used. The photopolymerization initiator and photopolymerization accelerator are appropriately selected from those known in the art depending on the intended purpose without any limitation.

Examples of the thermally curable resin include those listed as the reversible thermosensitive recording material in the reversible thermosensitive recording layer, and a method for curing is the same as described in the reversible thermosensitive recording layer.

The protective layer preferably contains a resin having low oxygen permeability. Use of such resin in the protective layer can to prevent oxidation of the electron-donating color-forming compound and the electron-accepting compound contained in the reversible thermosensitive recording layer.

A thickness of the protective layer is appropriately selected depending on the intended purpose without any limitation, but it is is preferably 0.1 μm to 10 μm.

<<Intermediate Layer>>

The intermediate layer is a layer provided between the protective layer and the reversible thermosensitive recording layer. Use of the intermediate layer in the reversible thermosensitive recording medium can improve adhesion of the protective layer to the reversible thermosensitive recording layer, prevent deterioration of the reversible thermosensitive recording layer caused by applying a coating liquid of the protective layer, and improve maintainability of image by preventing additives contained in the protective layer from migrating into the reversible thermosensitive recording layer.

A material of the intermediate layer is appropriately selected depending on the intended purpose without any limitation, and examples thereof include resins cured by heat, ultraviolet rays, or electron beams, and thermoplastic resins. These may be used independently, or in combination.

Examples of the resins curable by heat, ultraviolet rays, or electron beams include those listed the material of the reversible thermosensitive recording layer, and a method for curing is the same as described in the reversible thermosensitive recording layer.

The thermoset resin is not particularly limited, and examples thereof include polyethylene, polypropylene, polystyrene, polyvinyl alcohol, polyvinyl butyral, polyurethane, saturated polyester, unsaturated polyester, epoxy resin, phenol resin, polycarbonate, and polyamide.

Other than the aforementioned resin, the intermediate layer may further contain filler, and a UV absorber, if necessary.

An amount of the filler in the intermediate layer is appropriately selected depending on the intended purpose without any limitation, but it is preferably 1% by mass to 95% by mass, more preferably 5% by mass to 75% by mass, relative to the intermediate layer.

Moreover, an amount of the UV absorber in the intermediate layer is appropriately selected depending on the intended purpose without any limitation, but it is preferably 0.5% by mass to 10% by mass, relative to the resin.

Further, the intermediate layer preferably contains a resin of low oxygen permeability. Use of such resin in the intermediate layer can prevent oxidation of the electron-donating color-forming compound, and the electron-accepting compound in the reversible thermosensitive recording layer.

A thickness of the intermediate layer is appropriately selected depending on the intended purpose without any limitation, but it is preferably 0.1 m to 20 μm, more preferably 0.3 μm to 3 μm.

The intermediate layer can be formed by the similar method to that of the reversible thermosensitive recording layer.

<<Under Layer>>

The under layer is a layer provided between the reversible thermosensitive recording layer and the base (the first support). Having the under layer in the reversible thermosensitive recording medium can improve coloring sensitivity of the reversible thermosensitive recording layer, and improve adhesion between the reversible thermosensitive recording layer and the base. Further, use of hollow particles in the under layer can prevent heat radiation of energy applied from a thermal head.

A total thickness of the reversible thermosensitive recording medium of the present invention formed in the aforementioned manner is appropriately selected depending on the intended purpose without any limitation, but it is preferably 150 μm to 500 μm, more preferably 250 μm to 400 μm. When the total thickness is less than 150 μm, the total thickness is too thin to sufficiently press against a thermal head, which may cause a printing failure. Moreover, as the total thickness is too thin, excessive flexibility is applied, and therefore an operation for inserting into or taking from a holder may not be performed smoothly. When the total thickness thereof is greater than 500 μm, the flexibility is impaired, and therefore an effect of improving contactablity with a thermal head may not be exhibited, or a number of the mediums stackable in a stacker of the printer reduces. Further, when the total thickness thereof is 580 μm or greater, jamming may occur in a conveying system of a printer.

A shape of the reversible thermosensitive recording medium given by machining is appropriately selected depending on the intended purpose without any limitation, but it is preferred that the reversible thermosensitive recording medium be machined to have a card shape, or a sheet shape that is larger than the card shape.

Note that, a size of the card is typically about 54 mm×about 85 mm, and a size of the sheet is typically about 85 mm×about 200 mm.

When a total thickness of the reversible thermosensitive recording medium is large (e.g., greater than 500 μm), use of the reversible thermosensitive recording medium is limited to a small size card, and such reversible thermosensitive recording medium is not suitable for a large display or various display, and is not suitable to be used in a sheet size, such as a sticker for various chemical containers, a manual or work sheet in the manufacturing industries, and instructions for logistics (e.g., a parts control manifest), or for manufacturing process control (e.g., a process control manifest).

When the total thickness of the reversible thermosensitive recording medium is within the aforementioned preferable range, conversely, the reversible thermosensitive recording medium can be suitably used in the aforementioned uses.

<Mechanism of Coloring and Decoloring>

Here, a mechanism of reversely coloring and decoloring the reversible thermosensitive recording medium will be explained briefly.

The reversible thermosensitive recording material containing the electron-donating color-forming compound (coloring agent) and the electron-accepting compound (developing agent) in the reversible thermosensitive recording layer does not color in the state where the coloring agent and the developing agent are merely mixed in the state of solids.

However, when the reversible thermosensitive recording material is heated to high temperature, the entire reversible thermosensitive recording material is transformed into a melted state, and the coloring agent and the developing agent contained in the reversible thermosensitive recording material react to each other to color.

By quenching the melted reversible thermosensitive recording material, the coloring agent and the developing agent are detached from each other at temperature around the melting temperature thereof, and the coloring agent and the developing agent are each aggregated or crystallized to decolor. Then, this condition is frozen by solidification of the binder resin.

On the other hand, by quenching the colored reversible thermosensitive recording material of the melted state, the binder resin solidified before separation between the coloring agent and the developing agent occurs. Then, the reaction product of the coloring agent and the developing agent is frozen and solidified in the colored state.

Accordingly, by selecting the reversible thermosensitive recording material consisted of a combination of two compounds (a coloring agent and a developing agent) and a binder resin, which has an appropriate melting temperature and freezing temperature, and causes the aforementioned phenomenon, coloring or discoloring can be selected by adjusting the cooling speed after heat-melting, the colored state or decolored state can be kept in the frozen state at atmospheric temperature.

Figure 3:
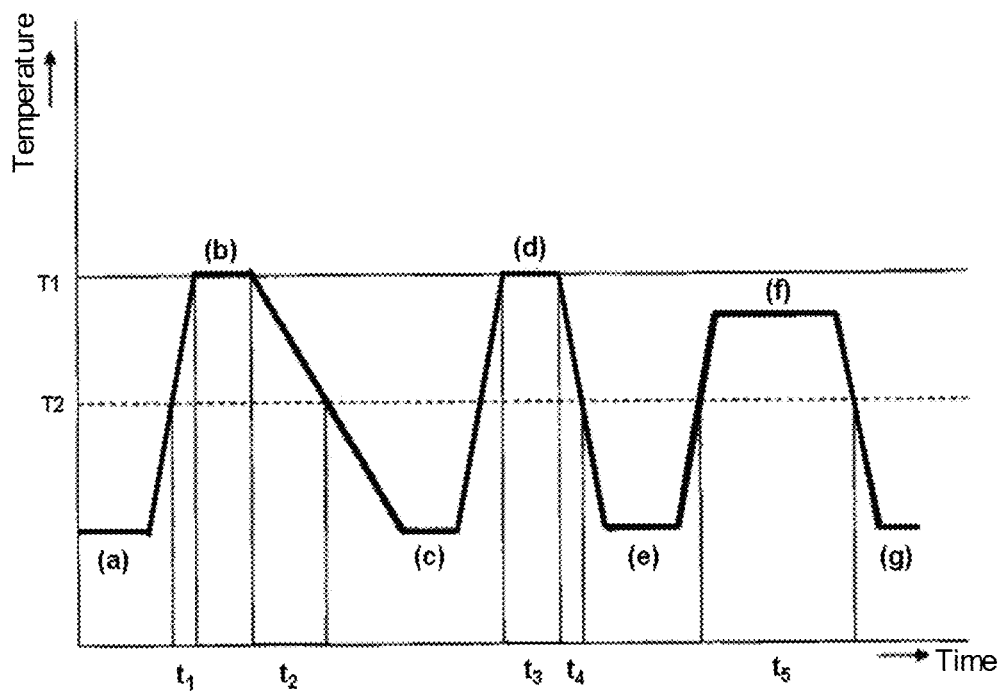
FIG. 3 is an explanatory diagram illustrating one example of a change with time of coloring and decoloring with respect to a change in temperature of a reversible thermosensitive recording material.

FIG. 3 is an explanatory diagram depicting one example of a change with time in coloring and decoloring of the reversible thermosensitive recording material corresponding to the temperature change. In FIG. 3, the transverse axis represents time, and the ordinate axis represents temperature.

The temperature T1 represents melt color reaction temperature of the coloring agent and the developing agent. The temperature T2 represents temperature at which the reversible thermosensitive recording material consisted of the coloring agent, the developing agent, and the binder resin is solidified in the frozen state.

Specifically, the colored reaction product between the coloring agent and developing agent in the reversible thermosensitive recording material is separated into the coloring agent and developing agent to be aggregated or crystallized in the temperature range between T1 and T2.

Note that, separating the reaction product to be aggregated or crystallized requires a certain period of the reaction time. In the graph depicted in FIG. 3, at first, the reversible thermosensitive recording material in the state (a) (colored state) at atmospheric temperature is heated to the temperature T1. When temperature of the reversible thermosensitive recording material reaches the temperature T1, the reversible thermosensitive recording material melts during the time t1, and stays in the colored state (b).

The reversible thermosensitive recording material is slowly cooled to the temperature T2 over the time $t_2$, followed by cooling to the atmospheric temperature. Since the time $t_2$ is equal to or longer than the time required for the melted and colored reaction product to separate into the coloring agent and the developing agent to thereby aggregated or crystallized, the reaction product is reversible thermosensitive recording material is dissociated before solidified to be in the frozen state, whereby frozen in the decolored state (c) at atmospheric temperature.

When the decolored reversible thermosensitive recording material is again heated to be in the melted state (d), the coloring agent and the developing agent in the reversible thermosensitive recording material are melted, and reacted to color. By quenching this composition within the short time $t_4$, followed by cooling to the atmospheric temperature, the reversible thermosensitive recording material is returned to the atmospheric temperature in the state (e) where the reacted molecules are frozen, hence keeping the colored state.

Further, by allowing the reversible thermosensitive recording material in the state (e) to be in the disassociation and crystallization temperature range between the melting temperature T1 and T2 for a long time $t_5$, the reaction product is separated into the coloring agent and the developing agent to be aggregated or crystallized, therefore the reversible thermosensitive recording material may be decolored. In this case, if the reversible thermosensitive recording material is returned to the atmospheric temperature, the reversible thermosensitive recording material keeps the decolored state (g).

By utilizing the aforementioned phase change of the reversible thermosensitive recording material, the composition can be colored or decolored by controlling heating temperature, cooling temperature, and cooling speed.

Note that, in the graph of FIG. 3, a gap between T1 and T2 is made schematically large. However, actually, as for this temperature gap, the reversible thermosensitive recording material having the temperature gap of a few degrees (° C.) to about ten degrees (° C.) is preferably selected.

Figure 4:
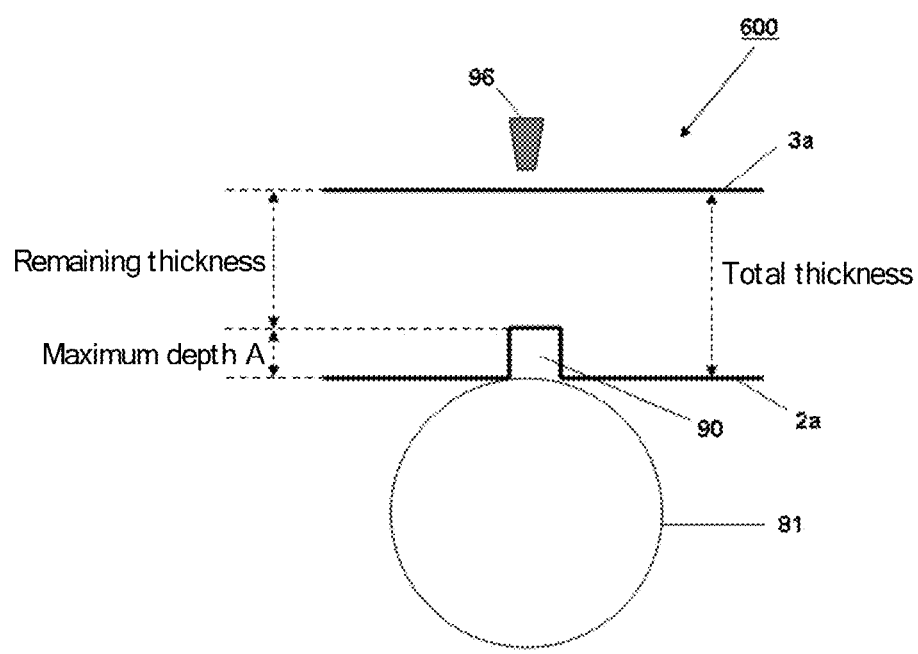
FIG. 4 is an explanatory diagram illustrating a mechanism of coloring and decoloring of a reversible thermosensitive recording material.

The reversible thermosensitive recording layer has the aforementioned characteristics. As illustrated in FIG. 4, however, a difference in thickness is formed between a total thickness of the reversible thermosensitive recording medium 600 and the remaining thickness thereof after laser marking, when a groove 90 is formed in the surface 2a of the second support of the reversible thermosensitive recording medium 600 by laser marking. The cooling speed is increased in order to maintain the colored state, but heat conductance (thermal diffusion) of the thermal energy applied from the thermal head 96 of the printer to the reversible thermosensitive recording medium 600 is prevented in the area around the groove 90 of the laser mark by an insulating effect from an air layer formed by the groove 90 of the laser mark laser, which slows cooling rate, and may turn the reversible thermosensitive recording material into a decoloring mode.

Although a relationship between the depth of the groove 90 of the laser mark and a total thickness of the reversible thermosensitive recording medium has not been clearly understood technically, it is assumed that, when thermal energy applied from the thermal head 96 of the printer diffuses thermally to the reversible thermosensitive recording medium 600, thermal diffusivity relative to a total thickness of the reversible thermosensitive recording medium 600, a thermal insulating effect of an air layer formed with the groove 90 of the laser mark, thermal conductivity (thermal diffusivity) to the platen roller 81 related to a presence or absence of the groove 90 of the laser mark, and close fitness to a platen roller or thermal diffusivity cased by the protrusion (not illustrated in FIG. 4) formed by laser marking are interrelated in a complicated manner.

Examples of the layer structure of the reversible thermosensitive recording medium of the present invention will be explained with reference to a drawing thereinafter, but the present invention is not limited to these examples.

First Embodiment

Figure 5:
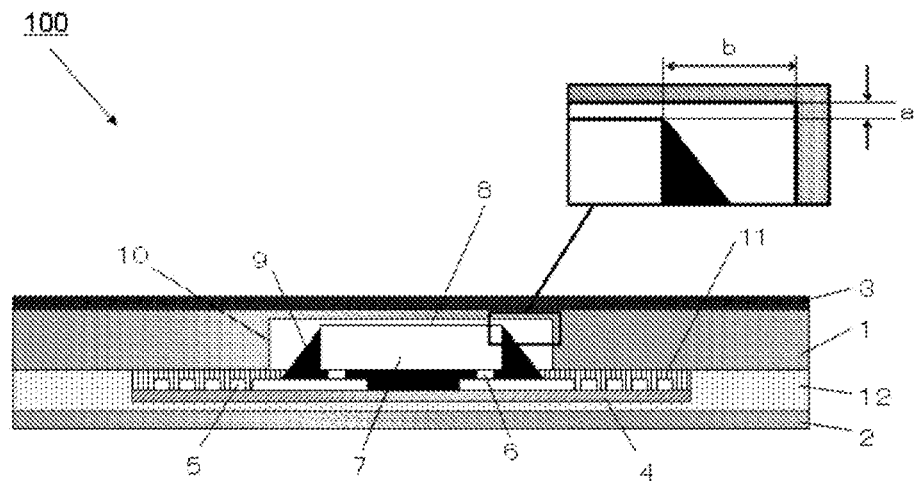
FIG. 5 is a diagram illustrating one embodiment of the reversible thermosensitive recording medium of the present invention.

FIG. 5 is a diagram illustrating one embodiment of the reversible thermosensitive recording medium of the present invention.

The reversible thermosensitive recording medium 100 contains: the reversible thermosensitive recording layer 3; the first support 1 provided adjacent to the reversible thermosensitive recording layer 3, and having the recess for accommodating an electronic information recording module 10 in an opposite surface to the surface thereof where the reversible thermosensitive recording layer 3 is provided; the second support 2 provided on an opposite surface of the first support 1 to the surface thereof on which the reversible thermosensitive recording layer 3 is provided; and an electronic information recording module 8 provided between the first support 1 and the second support 2, where the electronic information recording module 8 contains the module board 4, the antenna circuit 5 and electronic information recording element (IC chip) 7 provided on the module board 4, the electronic information recording element being fixed onto the antenna circuit 5 with bumps 6 and under fill 9. In the reversible thermosensitive recording medium 100, the first support 1 and the electronic information recording module 8 are bonded together with the first resin layer 11, and the second support 2 and the first support 1 are bonded together with the adhesive 12.

In the reversible thermosensitive recording medium 100, the electronic information recording element 7 is inserted into the recess for accommodating an electronic information recording module 10 to give a space of 15 μm or greater with respect to the thickness direction of the first support 1 of the reversible thermosensitive recording medium 100, and a space of 2 mm to 4 mm in the width direction (a vertical direction with respect to the thickness direction of the first support 1) of the recess for accommodating an electronic information recording module 10. Accordingly, bend durability can be maintained without impairing the mechanical resistance of the electronic information recording module 8, while a total thickness of the reversible thermosensitive recording medium 100 is maintained thin.

Moreover, by providing the second support 2 on the plane facing the first support 1 in the reversible thermosensitive recording medium 100, a balance of the stress on the front surface and that on the back surface of the reversible thermosensitive recording medium 100 is desirably maintained, which contributes to reduction in curling of the reversible thermosensitive recording medium.

Lot numbers or production date is marked on the surface of the second support 2 with laser in the size where each character fits in a rectangle of 3.5 mm in length, and 2.5 mm in width.

Second Embodiment

Figure 6:
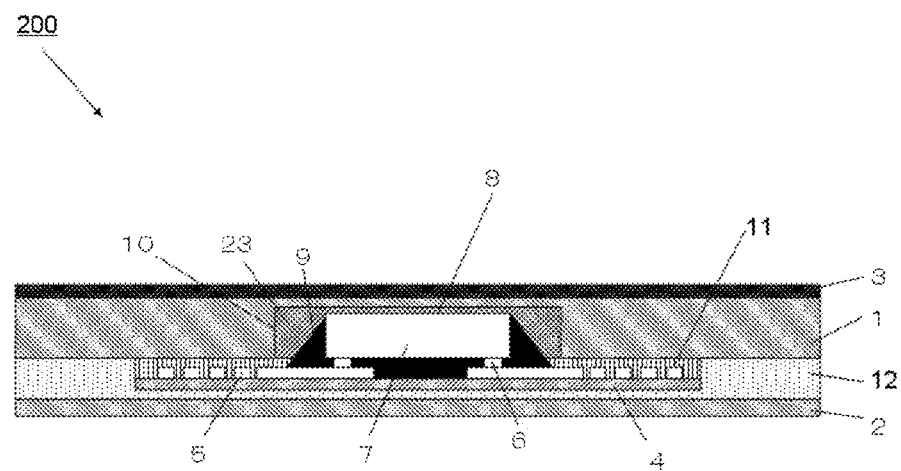
FIG. 6 is a diagram illustrating another embodiment of the reversible thermosensitive recording medium of the present invention.

FIG. 6 is a diagram illustrating another embodiment of the reversible thermosensitive recording medium of the present invention.

The reversible thermosensitive recording medium 200 contains, in addition to the first support 1 and the second support 2, the second resin layer 23 formed by filling, with a resin, the recess for accommodating an electronic information recording module 10 of the reversible thermosensitive recording medium 100 according to the first embodiment. Other configurations of the second embodiment are identical to those in the first embodiment, and hence explanations thereof are omitted.

Use of the reversible thermosensitive recording medium 200 brings the following advantages. The second resin layer 23 formed in the recess for accommodating an electronic information recording module prevents formation of set-back in a surface region of the reversible thermosensitive recording medium 200 corresponded to the area where the recess for accommodating an electronic information recording module 10 is present, and therefore formation and erasure of images of excellent image quality can be carried out.

Third Embodiment

Figure 7:
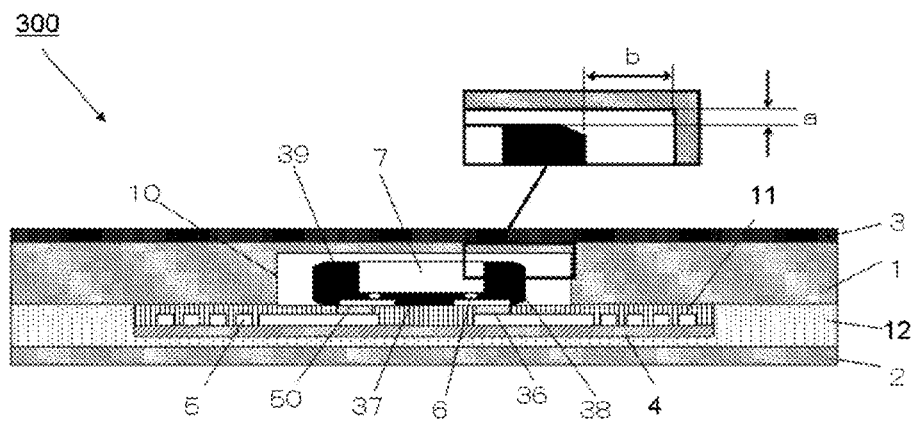
FIG. 7 is a diagram illustrating yet another embodiment of the reversible thermosensitive recording medium of the present invention.

FIG. 7 is a diagram illustrating yet another embodiment of the reversible thermosensitive recording medium of the present invention.

The reversible thermosensitive recording medium 300 involves with a modification example of an electronic information recording module, and contains the electronic information recording module 38 in which the IC package 37 is connected to the antenna circuit 5 via the external terminals 50 and the solder balls 36, where the IC package 37 is formed by connecting the electronic information recording element 7 with the external terminals 50 via the bumps 6, and sealed with the resin 39. Other configurations of the third embodiment are identical to those in the first embodiment, and hence explanations thereof are omitted.

In the reversible thermosensitive recording medium 300, the IC package 37 is inserted into the recess for accommodating an electronic information recording module 10 to give a space of 15 μm or greater with respect to the thickness direction of the first support 1 of the reversible thermosensitive recording medium 300, and a space of 2 mm to 4 mm in the width direction of the recess for accommodating an electronic information recording module 10. Therefore, bend durability can be maintained without impairing the mechanical resistance of the electronic information recording module 38, while a total thickness of the reversible thermosensitive recording medium 300 is maintained thin.

Fourth Embodiment

Figure 8:
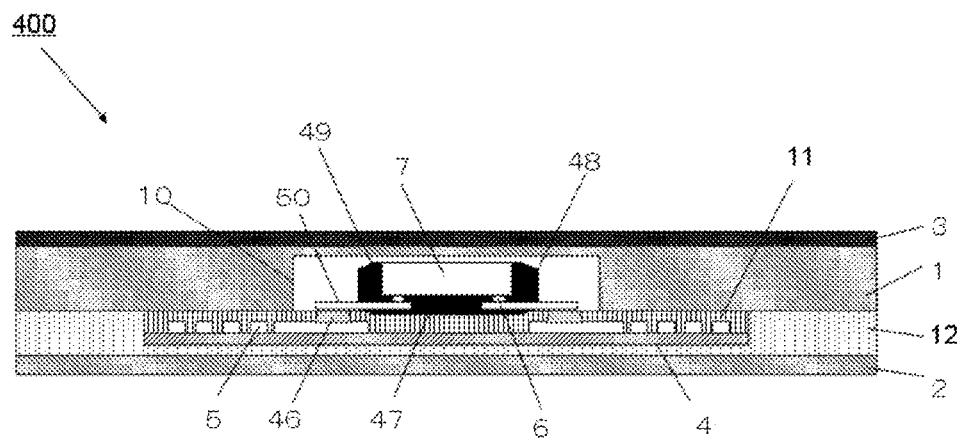
FIG. 8 is a diagram illustrating yet another embodiment of the reversible thermosensitive recording medium of the present invention.

FIG. 8 is a diagram illustrating yet another embodiment of the reversible thermosensitive recording medium of the present invention.

The reversible thermosensitive recording medium 400 contains the electronic information recording module 48 in which the IC package 47 is connected to the antenna circuit 5 via the external terminals 50 and the solders 46, where the IC package 47 is formed by connecting the electronic information recording element 7 to the external terminals 50 via the bumps 6 and sealing with the resin 49. Other configurations of the fourth embodiment are identical to those in the first embodiment, and hence explanations thereof are omitted.

In the reversible thermosensitive recording medium 400, the IC package 47 is inserted into the recess for accommodating an electronic information recording module 10 to give a space of 15 μm or greater with respect to the thickness direction of the first support 1 of the reversible thermosensitive recording medium 400, and a space of 2 mm to 4 mm in the width direction of the recess for accommodating an electronic information recording module 10. Therefore, bend durability can be maintained without impairing the mechanical resistance of the electronic information recording module 48, while a total thickness of the reversible thermosensitive recording medium 400 is maintained thin.

<Use>

The reversible thermosensitive recording medium of the present invention can form images of excellent quality without leaving any white missing part in an image when an image is formed in the reversible thermosensitive layer after a laser mark has been formed, and can stably carried out coloring and decoloring. Accordingly, the reversible thermosensitive recording medium of the present invention can be suitable for use in a card size, for example, cash cards, credit cards, pre-paid cards; cards used for public transport, such as railway, bus, and motor way services; member's cards for digital broadcasting services, or 3G mobile phone services; and cards such as library cards, student cards, employee ID cards, and resident registration cards. Moreover, the reversible thermosensitive recording medium of the present invention can be also suitable for use in a sheet size, which is bigger than the card size, such as work sheets, and instructions (e.g., a parts control manifest, and a process control manifest).

A method for forming and erasing an image on the reversible thermosensitive recording medium of the present invention is not particularly limited, and appropriately selected image processing methods and image processing devices are used depending on the intended purpose. However, it is preferred that image forming and erasing be performed by using the image processing device and image processing method described below.

(Image Processing Device and Image Processing Method)

An image processing device for forming and/or erasing an image on the reversible thermosensitive recording layer of the reversible thermosensitive recording medium of the present invention is appropriately selected depending on the intended purpose without any limitation, but the image processing device preferably contains an image forming unit, or an image deleting unit, or both thereof, and may further contain appropriately selected other units, such as a transporting unit, and a controlling unit.

An image processing method for forming and/or erasing an image on the reversible thermosensitive recording layer of the reversible thermosensitive recording medium of the present invention is appropriately selected depending on the intended purpose without any limitation, but the image processing method preferably contains an image forming step, or an image deleting step, or both thereof, and may further contain appropriately selected other steps, such as a transporting step, and a controlling step.

The image processing method can be suitably carried out by the image processing device, the image forming step and the image deleting step can be carried out by the image forming unit and the image deleting unit, respectively, and the aforementioned other steps can be carried out by the aforementioned other units.

<Image Forming Unit and Image Forming Step>

The image forming step is heating the reversible thermosensitive recording medium of the present invention to form an image, and is suitably carried out by the image forming unit.

The image forming unit is appropriately selected depending on the intended purpose without any limitation, and examples thereof include a thermal head, and a laser emitter. These may be used independently, or in combination.

<Image Deleting Unit and Image Deleting Step>

The image deleting step is heating the reversible thermosensitive recording medium of the present invention to erase the image, and is suitably carried out by the image deleting unit.

The image deleting unit is a unit configured to heat the reversible thermosensitive recording medium of the present invention to erase the image, and examples thereof include a hot stamp, a ceramic heater, a heat roller, a heat block, a hot blast, a thermal head, and a laser emitter. Among them, the ceramic heater, and the thermal head are preferable.

Use of the ceramic heater realizes a small-size device, and a stable decoloring state, which leads to formation of an image with high contrast. The set temperature of the ceramic heater is appropriately selected depending on the intended purpose without any limitation, but it is preferably 110° C. or higher, more preferably 112° C. or higher, and even more preferably 115° C. or higher.

Use of the thermal head contributes to further downsizing and reduction in consumption of electric power, and realizes a portable device driven by a battery. Moreover, recording and deleting of images can be both performed by a single thermal head, which realizes to down size even further. In the case where recording and erasing are performed by a single thermal head, after erasing all images once, a new image may be recorded. Alternatively, an overwriting system may be employed. The overwriting system is erasing previously recorded images by varying the applying energy per image, followed by recording new images. In the overwriting system, a total duration for recording and deleting of the image is short, leading to speed up of recording.

<Transporting Unit and Transporting Step>

The transporting step is consecutively transporting the reversible thermosensitive recording mediums, and is suitably carried out by the transporting unit.

The transporting unit is appropriately selected depending on the intended purpose without any limitation, provided that it has a function for transporting. Examples thereof include a conveyer belt, a conveyer roller, and a combination of a conveyer belt and a conveyer roller.

<Controlling Unit and Controlling Step>

The controlling step is controlling each step, and is suitably carried out by the controlling unit.

The controlling unit is not particularly limited as long as it has a function of controlling each step, and examples thereof include equipments such as a sequencer, and a computer.

One embodiment for performing the image processing method by the image processing device will be specifically explained with reference to a drawing, but the present invention is not limited to this embodiment.

Figure 9:
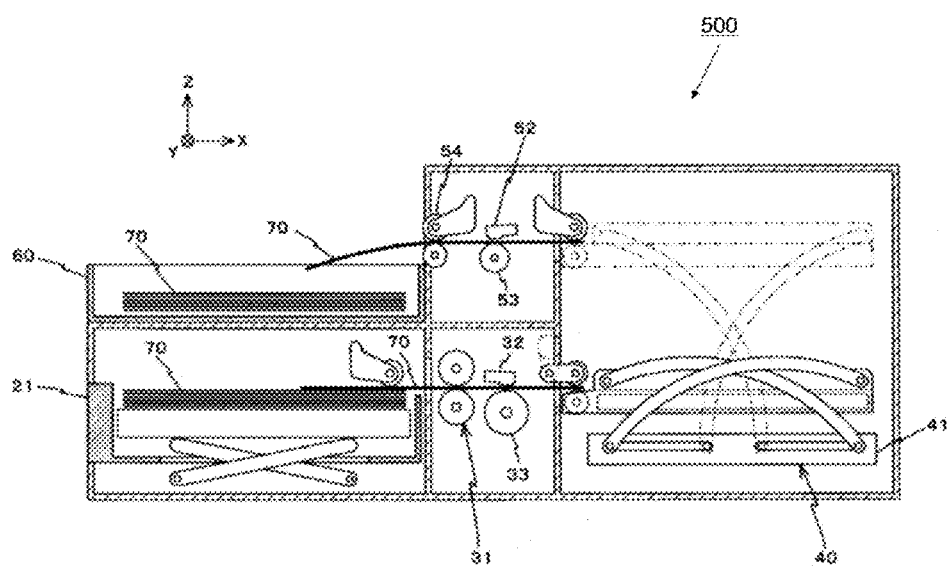
FIG. 9 is a diagram illustrating one embodiment of an image processing device and image processing method used for forming and erasing an image on the reversible thermosensitive recording medium of the present invention.

FIG. 9 is a diagram illustrating one embodiment of the image processing device and image processing method for performing formation and erasure of images on the reversible thermosensitive recording medium of the present invention. The image processing device 500 is equipped with the erase head 32, thermal head 52, and conveyer rollers 31, 33, 53. In this image processing device 500, the erase head 32 heats and erases the image recorded on the reversible thermosensitive recording layer. Subsequently, processed new information is recorded on the reversible thermosensitive recording layer by the thermal head 52.

In the case where the reversible thermosensitive recording medium 70 contains an RF-ID tag, the image processing device 500 contains the RF-ID reader writer 41 in the transport tray 40.

In the image processing device 500, at first, the image recorded on the reversible thermosensitive recording layer is heated and erased by the erase head 32. Next, the information stored in the RF-ID tag of the reversible thermosensitive recording medium 70 is read out by the RF-ID reader writer 41 and new information is input in the RF-ID tag. Thereafter, based on the information read and rewritten by the RF-ID reader writer, processed new information is recorded on the reversible thermosensitive recording layer by the thermal head 52. Note that, the RF-ID reader writer is taken as an example in this embodiment, but it is appropriately selected depending on the intended purpose without any limitation, provided that reading or rewiring information of the electronic information recording module can be performed. Moreover, the image processing device may contain a barcode reader, or a magnetic head.

In the case of the barcode reader, the barcodes and other visual information recorded on the reversible thermosensitive recording layer are erased by the erase head 32, and the information already recorded on the reversible thermosensitive recording layer is read. Thereafter, new information processed based on the information read out from the barcodes are recorded as barcodes and other visual information on the reversible thermosensitive recording layer by the thermal head.

The image processing device 500 has a feeding cassette 21 for stacking the reversible thermosensitive recording media 70, and the reversible thermosensitive recoding medium 70 is picked up one by one from the feeding cassette 21 by a feeding method such as a friction pad system. The transported reversible thermosensitive recording medium is conveyed by the conveyer roller 31. The reversible thermosensitive recording medium 70 is transported by the conveyer roller 33 to the erase head 32, which is the erasing unit, to erase the visual information recorded on the reversible thermosensitive recording medium 70. Thereafter, the reversible thermosensitive recording medium 70 is sent to the RF-ID reader writer 41 to carry out reading and writing of the data.

The surface temperature of the erase head section 32 is appropriately selected depending on the intended purpose without any limitation, provided that the surface temperature thereof is matched with the erasing temperature of the reversible thermosensitive recording medium, but it is preferably 100° C. to 190° C., more preferably 110° C. to 180° C., and even more preferably 115° C. to 170° C.

Further, the reversible thermosensitive recording medium 70 is transported to the thermal head section 52, to record new information on the reversible thermosensitive recording medium 70. Thereafter, the reversible thermosensitive recording medium 70 is transported by the conveyer roller 53, and discharged to the discharge tray 60 from the discharging section 54 located at the upper part of the device.

EXAMPLES

The present invention will be more specifically explained through Examples and Comparative Examples thereof, but these Examples shall not be construed as limiting the scope of the present invention in any way.

Production Example 1

Production of Reversible Thermosensitive Recording Medium A

As for Reversible Thermosensitive Recording Medium A having a total thickness of 380 μm, Reversible Thermosensitive Recording Sheet A (CR Film 630BD, manufactured by Ricoh Company Limited) was used. Reversible Thermosensitive Recording Sheet A was prepared by providing a reversible thermosensitive recording layer on one surface of a PET sheet serving as a first support (LUMIRROR (registered trade mark) E22, thickness: 188 μm, manufactured by Toray Industries, Inc.). The details of Reversible Thermosensitive Recording Sheet A are as follows.

—Formation of Undercoat Layer—

Materials of an undercoat layer presented in the following to formulation were stirred for about 1 hour until the mixture became homogenous, to thereby prepare an undercoat layer coating liquid.

[Formulation]

| | |
|---|---|
| Styrene-butadiene copolymer (PA-9159, manufactured by Nippon A&L Inc.) | 30 parts by mass |
| Polyvinyl alcohol resin (POVAL PVA103, manufactured by KURARAY CO., LTD.) | 12 parts by mass |
| Hollow particles (MATSUMOTO MICROSPHERE (registered trade mark) R-300, manufactured by Matsumoto Yushi-Seiyaku Co., Ltd.) | 20 parts by mass |
| Water | 40 parts by mass |

The obtained undercoat layer coating liquid was applied onto the first support (LUMIRROR (registered trade mark) E22, thickness: 188 μm, manufactured by Toray Industries, Inc.) with a wire bar, and the applied coating liquid was dried at 80° C. for 2 minutes, to thereby form an undercoat layer having a thickness of 20 μm.

—Formation of Reversible Thermosensitive Recording Layer—

Materials of a reversible thermosensitive recording layer presented in the following formulation were pulverized by means of a ball mill to give the number average particle diameter of 0.1 μm to 1.0 μm, to thereby prepare a reversible thermosensitive recording layer dispersion liquid.

Note that, the number average particle diameter was measured by means of a laser diffraction/scattering particle size distribution analyzer (LA-700, manufactured by HORIBA, Ltd.) in a conventional method.

[Formulation]

| | |
|---|---|
| 2-Anilino-3-methyl-6-dibutylaminofluoran (leuco dye) | 1 part by mass |
| Electron-accepting compound (developing agent) represented by the following structural formula | 4 parts by mass |

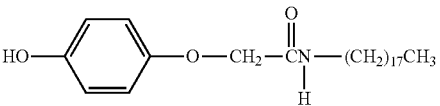

| | |
|---|---|
| Dialkyl urea (HAKREEN SB, manufactured by Nippon Kasei Chemical Co., Ltd.) | 1 part by mass |
| 40% by mass solution of acryl polyol resin (LR327, manufactured by Mitsubishi Rayon Co., Ltd., hydroxyl value: 108, glass transition temperature: 80° C.) | 10 parts by mass |
| Methylethylketone | 80 parts by mass |

Next, to the reversible thermosensitive recording layer dispersion liquid, 4 parts by mass of isocyanate (CORONATE HL, manufactured by Nippon Polyurethane Industry Co., Ltd.) was added, and the resulting mixture was sufficiently stirred, to thereby prepare a reversible thermosensitive recording layer coating liquid. The obtained reversible thermosensitive recording layer coating liquid was applied onto the undercoat layer (an opposite side to the side of the undercoat layer where the first support had been provided) with a wire bar, and the applied coating liquid was dried at 100° C. for 2 minutes, followed by heating at 60° C. for 24 hours, to thereby form a reversible thermosensitive recording layer having a thickness of 13 μm.

—Formation of Intermediate Layer—

Materials of an intermediate layer presented in the following formulation were sufficiently stirred to thereby prepare a coating liquid for an intermediate layer.

[Formulation]

| | |
|---|---|
| 50% by mass solution of acrylic polyol resin (LR-503, manufactured by Mitsubishi Rayon Co., Ltd., hydroxyl value: 64, glass transition temperature: 80° C.) | 3 parts by mass |
| 30% by mass dispersion liquid of zinc oxide particles (ZS303, manufactured by Sumitomo Osaka Cement Co., Ltd.) | 7 parts by mass |
| Isocyanate curing agent (CORONATE HL, manufactured by Nippon Polyurethane Industry Co., Ltd.) | 1.5 parts by mass |
| Methylethylketone | 7 parts by mass |

The obtained coating liquid for an intermediate layer was applied onto the reversible thermosensitive recording layer (an opposite side to the side of the reversible thermosensitive recording layer where the undercoat layer had been formed) with a wire bar, and the applied coating liquid was dried at 90° C. for 1 minute, followed by heating at 60° C. for 2 hours, to thereby form an intermediate layer having a thickness of about 2 μm.

—Formation of Protective Layer—

Materials of a protective layer presented in the following formulation were pulverized by means of a ball mill to give the number average particle diameter of 2 μm to 3 μm, to thereby prepare a protective layer coating liquid.

Note that, the number average particle diameter was measured by means of a laser diffraction/scattering particle size distribution analyzer (LA-700, manufactured by HORIBA, Ltd.) in a conventional method.

[Formulation]

| | |
|---|---|
| Acrylate compound (KAYARAD DPHA (solid content: 100% by mass), manufactured by Nippon Kayaku Co., Ltd.) | 4 parts by mass |
| Acrylate compound (KAYARAD DPCA-60, manufactured by Nippon Kayaku Co., Ltd.) | 21 parts by mass |
| Silica (P-526, manufactured by Mizusawa Industrial Chemicals, Ltd.) | 2 parts by mass |
| Photopolymerization initiator (IRGACURE 184, manufactured by Nihon Chiba-Geigy K.K.) | 1 part by mass |
| Isopropylalcohol | 60 parts by mass |
| Toluene | 10 parts by mass |

The obtained protective layer coating liquid was applied onto the intermediate layer (an opposite side to the side of the intermediate layer where the reversible thermosensitive recording layer had been formed) with a wire bar, and the applied coating liquid was dried at 90° C. for 1 minute, followed by crosslinked under an UV lamp with irradiation energy of 80 W/cm, to thereby form a protective layer having a thickness of 3 μm.

In the manner as described above, Reversible Thermosensitive Recording Sheet A (CR Film 630BD, manufactured by Ricoh Company Limited) was produced.

—Formation of Recess for Accommodating Electronic Information Recording Module—

In the first support (an opposite surface to the surface on which the reversible thermosensitive recording layer had been formed) of Reversible Thermosensitive Recording Sheet A, a recess for accommodating an electronic information recording module having a diameter of 7 mm and a depth of 150 μm was formed by machining to set back with respect to the thickness direction of the first support.

—Formation of Electronic Information Recording Module—

An electronic information recording module was bonded to the first support via a hot-melt adhesive (Bondmaster 170-7310, manufactured by Nippon NSC Ltd.) by a roll press in the manner that an IC chip was accommodated in the recess for accommodating an electronic information recording module formed in the first support. As the electronic information recording module, used was Electronic Information Recording Module A (RKT132, manufactured by Hitachi Corporation) having a module board, and having an antenna circuit, and an IC chip on the module board, where the IC chip was fixed to the circuit board with bumps and under fill. At the time of the bonding, the electronic information recording module and the first support were arranged so that a space between the IC chip and the recess with respect to the thickness direction was 10 μm.

—Formation of Adhesive Layer—

A hot melt adhesive (Bondmaster 170-7310, manufactured by Nippon NSC Ltd.) was applied in a thickness of 101 μm on a surface of Reversible Thermosensitive Recording Sheet A (first support side) in which the electronic information recording module had been formed by roll coating.

—Formation of Second Support—

As a second support, a PET sheet (LUMIRROR (registered trade mark) E20, manufactured by Toray Industries, Inc., thickness: 38 μm) on one surface of which an antistatic layer had been provided in the following manner, was used.

Materials of an antistatic layer presented in the following formulation were sufficiently stirred by means of a ball mill, to thereby prepare a coating liquid for an antistatic layer.

[Formulation]

| | |
|---|---|
| UV curable electric conductive polymer (SEPLEGYDA (registered trade mark) HC-A04, manufactured by Shin-Etsu Finetech Co., Ltd.) | 100 parts by mass |
| Initiator (IRGACURE I-184, manufactured by Nihon Chiba-Geigy K.K.) | 0.6 parts by mass |
| Acryl particles (Chemisnow MX1500, manufactured by Soken Chemical & Engineering Co., Ltd., spherical filler with a number average particle diameter of 15 μm) | 0.95 parts by mass |

The obtained coating liquid for an antistatic layer was applied onto a PET sheet (E20, manufactured by Toray Industries, Inc., thickness: 38 μm) with a wire bar, and the applied coating liquid was dried at 110° C. for 2 minutes, followed by crosslinking under a UV lamp at 80 W/cm, 10 m/min, and 3 passes, to thereby form an antistatic layer having a thickness of about 15 μm, which was used below as a second support.

—Bonding of First Support with Second Support—

The first support and the second support were bonded together by a roll press so as to face the surface of the second support opposite to the surface thereof on which the antistatic layer had been provided to the surface of the first support on which the electronic information recording module had been bonded and the adhesive layer had bee formed (a surface of the adhesive layer opposite to a surface thereof on which the first support had been formed).

—Profiling—

After bonding the first support and the second support, the resultant was cut out, by means of a die, in the size of 85 mm×200 mm as an IC sheet, to thereby produce Reversible Thermosensitive Recording Medium A having a total thickness of 380 μm.

Note that, the layer structure of Reversible Thermosensitive Recording Medium A contained the following layers in the order as presented:
Protective Layer/Intermediate Layer/Reversible Thermosensitive Recording Layer/Undercoat Layer/First Support accommodating Electronic Information Recording Module/Adhesive Layer/Second Support/Antistatic Layer Production Example 2

Production of Reversible Thermosensitive Recording Medium B

Reversible Thermosensitive Recording Medium B having a total thickness of 300 μm was produced in the same manner as in Production Example 1, provided that the thickness of the adhesive layer was changed from 101 μm to 36 μm, and the antistatic layer (thickness: about 15 μm) was not formed to the second support.

Production Example 3

Production of Reversible Thermosensitive Recording Medium C

Reversible Thermosensitive Recording Medium C having a total thickness of 360 μm was produced in the same manner as in Production Example 1, provided that the thickness of the adhesive layer was changed from 101 μm to 81 μm.

Production Example 4

Production of Reversible Thermosensitive Recording Medium D

Reversible Thermosensitive Recording Medium D having a total thickness of 500 μm was produced in the same manner as in Production Example 1, provided that the thickness of the adhesive layer was changed from 101 μm to 221 μm.

Example 1

Ten characters of number, from "0" to "9", were each marked, in a size that fitted in a rectangle of 3.5 mm in length and 2.5 mm in width, on a surface of the second support of Reversible Thermosensitive Recording Medium A by laser marking under the following conditions.
[Conditions]
Laser device: $CO_2$ laser (class 4) ML-Z9520 (Controller ML-Z9500), manufactured by KEYENCE CORPORATION
Print resolution: 5 μm
Focal depth (distance between a plain at which a laser is equipped and a surface of the second support): 300 mm
Wavelength: 10.6 nm
Linear velocity (scanning speed): 1,000 mm/s
Laser output: 14.15 W (using 47.2% of 30 W)
Energy density: 0.01415 W/(mm/s)

Example 2

Laser marking was performed in the same manner as in Example 1, provided that Reversible Thermosensitive Recording Medium A was replaced with Reversible Thermosensitive Recording Medium B, the laser output was changed from 14.15 W (using 47.2% of 30 W) to 13.2 W (using 44% of 30 W), and the energy density was changed from 0.01415 W/(mm/s) to 0.0132 W/(mm/s).

Example 3

Laser marking was performed in the same manner as in Example 1, provided that reversible thermosensitive recording medium A was replaced with reversible thermosensitive recording medium C, the laser output was changed from 14.15 W (using 47.2% of 30 W) to 13.95 W (using 46.5% of 30 W), and the energy density was changed from 0.01415 W/(mm/s) to 0.01395 W/(mm/s).

Example 4

Laser marking was performed in the same manner as in Example 1, provided that reversible thermosensitive recording medium A was replaced to reversible thermosensitive recording medium D, the laser output was changed from 14.15 W (using 47.2% of 30 W) to 15.45 W (using 51.5% of 30 W), and the energy density was changed from 0.01415 W/(mm/s) to 0.01545 W/(mm/s).

Example 5

Laser marking was performed in the same manner as in Example 1, provided that the laser output was changed from 14.15 W to 13.5 W (using 45% of 30 W), and the energy density was changed from 0.01415 W/(mm/s) to 0.0135 W/(mm/s).

Example 6

Laser marking was performed in the same manner as in Example 1, provided that the laser output was changed from 14.15 W to 12 W (using 40% of 30 W), and the energy density was changed from 0.01415 W/(mm/s) to 0.012 W/(mm/s).

Example 7

Laser marking was performed in the same manner as in Example 1, provided that the laser output was changed from 14.15 W to 10.5 W (using 35% of 30 W), and the energy density was changed from 0.01415 W/(mm/s) to 0.0105 W/(mm/s).

Example 8

Laser marking was performed in the same manner as in Example 1, provided that the laser output was changed from 14.15 W to 9.75 W (using 32.5% of 30 W), and the energy density was changed from 0.01415 W/(mm/s) to 0.00975 W/(mm/s).

Example 9

Laser marking was performed in the same manner as in Example 1, provided that the laser output was changed from 14.15 W to 9 W (using 30% of 30 W), and the energy density was changed from 0.01415 W/(mm/s) to 0.009 W/(mm/s).

Example 10

Laser marking was performed in the same manner as in Example 2, provided that the laser output was changed from 13.2 W (using 44% of W) to 8.85 W (using 29.5% of 30 W), and the energy density was changed from 0.0132 W/(mm/s) to 0.00885 W/(mm/s).

Example 11

Laser marking was performed in the same manner as in Example 3, provided that Reversible Thermosensitive Recording Medium A was replaced with Reversible Thermosensitive Recording Medium C, the laser output was changed from 13.95 W (using 46.5% of 30 W) to 8.91 W (using 29.7% of 30 W), and the energy density was changed from 0.01395 W/(mm/s) to 0.00891 W/(mm/s).

Example 12

Laser marking was performed in the same manner as in Example 4, provided that the laser output was changed from 15.45 W (using 51.5% of 30 W) to 9.3 W (using 31% of 30 W), and the energy density was changed from 0.01545 W/(mm/s) to 0.0093 W/(mm/s).

Comparative Example 1

Laser marking was performed in the same manner as in Example 1, provided that the laser output was changed from 14.15 W to 15 W (using 50% of 30 W), and the energy density was changed from 0.01415 W/(mm/s) to 0.015 W/(mm/s).

Comparative Example 2

Laser marking was performed in the same manner as in Example 1, provided that the laser output was changed from 14.15 W to 14.25 W (using 47.5% of 30 W), and the energy density was changed from 0.01415 W/(mm/s) to 0.01425 W/(mm/s).

<Measurements of Maximum Depth A and Maximum Depth B>

The maximum depth A and the maximum depth B in each of the reversible thermosensitive recording mediums of Examples 1 to 12 and Comparative Examples 1 to 2 were measured in the following manner. The results are presented in Table 1.

—Measurement of Maximum Depth A and Calculation of Ratio of Maximum Depth A—

As for the maximum depth A, a length from a surface of the second support to the deepest point on the bottom of the groove of the laser mark at the intersection in the number "4" which had been engraved by laser marking (the depth of the laser mark with respect to the thickness direction of the reversible thermosensitive recording medium) was measured three-dimensionally with a 3D image which was obtained by a digital microscope (VHX-1000, manufactured by KEYENCE CORPORATION) with wide-range zoom lens VH-Z100R, magnification of 300 times, and scan pitch of 2 μm.

A ratio of the maximum depth A with respect to the total thickness of the reversible thermosensitive recording medium was calculated based on the measured maximum depth A using the following equation 1.

Ratio of maximum depth $A$ (%)=maximum depth $A$ (μm)/total thickness of reversible thermosensitive recording medium (μm)×100     Equation 1

—Measurement of Maximum Depth B and Calculation of Ratio of Maximum Depth B—

As the maximum depth B, a total length from the deepest point on the bottom of the groove of the laser mark at the intersection of the number "4" engraved by laser marking to the highest apex of the protrusion formed of the melted second support around the intersection (the depth of the laser mark with respect to the thickness direction of the reversible thermosensitive recording medium) was measured three-dimensionally with a 3D image which was obtained by a digital microscope (VHX-1000, manufactured by KEYENCE CORPORATION) with wide-range zoom lens VH-Z100R, magnification of 300 times, and scan pitch of 2 μm.

A ratio of the maximum depth B with respect to the total thickness of the reversible thermosensitive recording medium was calculated based on the measured maximum depth B using the following equation 2.

Ratio of maximum depth $B$ (%)=maximum depth $B$ (μm)/total thickness of reversible thermosensitive recording medium (μm)×100     Equation 2

Figure 10A:
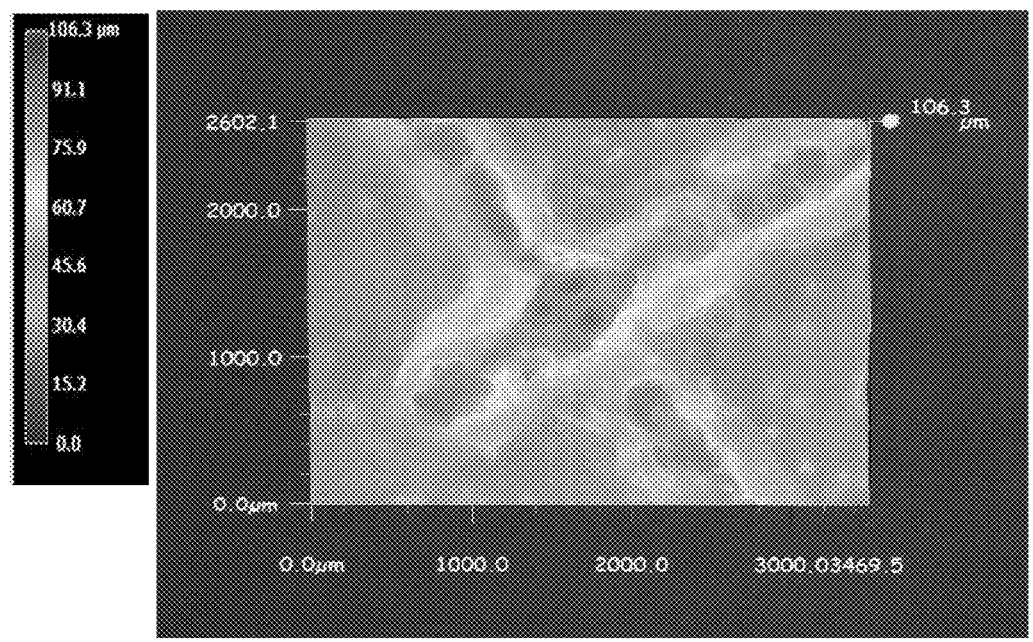
FIG. 10A is a diagram illustrating one example of a result of the maximum depth A and maximum depth B of Comparative Example 1 measured by a digital microscope.
Figure 10B:
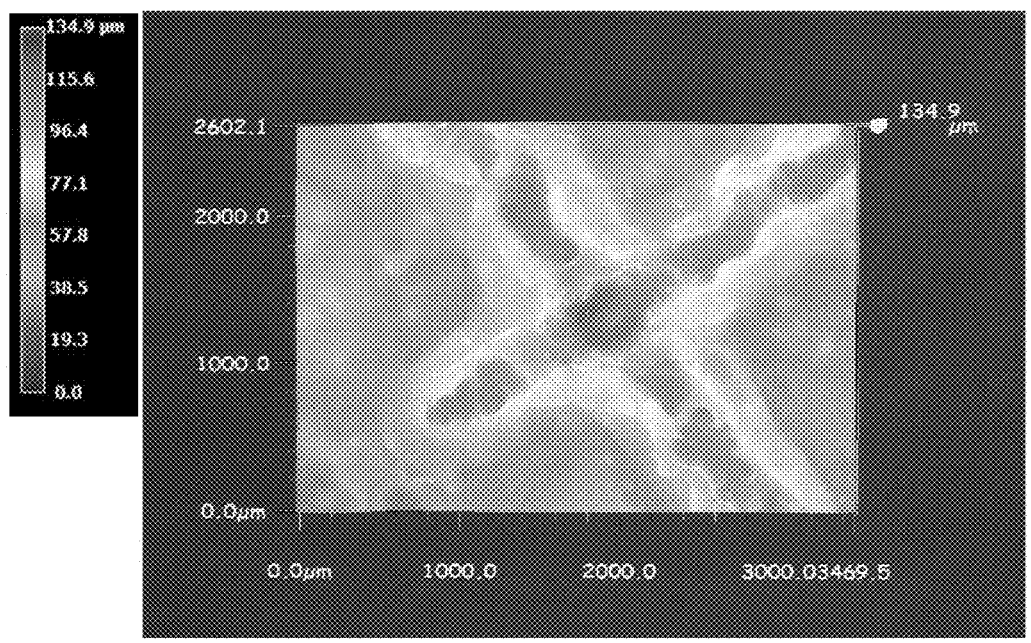
FIG. 10B is a diagram illustrating one example of a result of the maximum depth A and maximum depth B of Example 5 measured by a digital microscope.
Figure 10C:
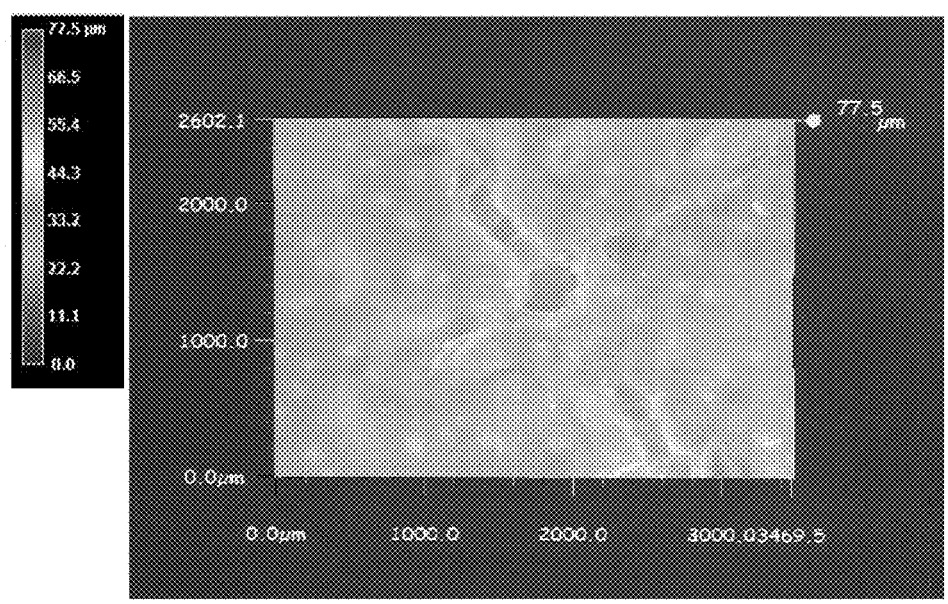
FIG. 10C is a diagram illustrating one example of a result of the maximum depth A and maximum depth B of Example 9 measured by a digital microscope.

One example of the results of the maximum depth A and the maximum depth B measured by the digital microscope (VHX-1000, manufactured by KEYENCE CORPORATION) is depicted in FIGS. 10A to 10C. FIG. 10A is a diagram depicting the measurement results of Comparative Example 1, FIG. 10B is a diagram depicting the measurement results of Example 5, and FIG. 10C is a diagram depicting the measurement results of Example 9. Only the results of Comparative Example 1, and Examples 5 and 9 are depicted in the diagrams, but the measurements can be performed in the same manner in other Examples and Comparative Examples.

<Evaluation>

A white missing part (print failure) in the reversible thermosensitive recording layer of the reversible thermosensitive recording media of Examples 1 to 12 and Comparative Examples 1 to 2, and visibility of the characters formed in the surface of the second support of the reversible thermosensitive recording media of Examples 1 to 12 and Comparative Examples 1 to 2 by laser marking were evaluated in the following manners. The results are presented in Table 1.

—White Missing Part—

To each of the reversible thermosensitive recording media of Examples 1 to 12 and Comparative Examples 1 to 2, the image on the surface of the reversible thermosensitive recording layer was erased by means of a printer (PR-K Printer, manufactured by SHINFONIA TECHNOLOGY CO., LTD.) in the environment having the temperature of 5° C. and the relative humidity of 30%, followed by coloring the entire surface of the reversible thermosensitive recording layer with a solid image by means of the same printer. The area of the solid colored reversible thermosensitive recording layer corresponding to the opposite side of the laser mark (the area of the reversible thermosensitive recording layer corresponding to the area of the laser mark) was evaluated in terms of the presence of a white missing part in the printed image, based on the following evaluation criteria.

[Evaluation Criteria]

A: No white missing part was observed in the area of the reversible thermosensitive recording layer corresponding to the area of the laser mark.

B: A white mixing part was slightly observed in the area of the reversible thermosensitive recording layer corresponding to the area of the laser mark.

C: A white mixing part was clearly observed in the area of the reversible thermosensitive recording layer corresponding to the area of the laser mark.

—Visibility—

The visibility of the entire laser marked characters in the surface of the second surface was evaluated with the reversible thermosensitive recording media of Examples 1 to 12 and Comparative Examples 1 to 2 based on the following evaluation criteria.

A: The laser marked character was clearly recognized.

B: The laser marked character was partially missing and was difficult to recognize, but it is not problem in practical use.

C: The laser marked character was not recognized at all.

TABLE 1

| | Conditions | | | Results of measurements | | | | | | Evaluation | |
|---|---|---|---|---|---|---|---|---|---|---|---|
| | Laser output [W] | Ratio of output power (30 W) [%] | Energy density [W/(mm/s)] | Total thickness [μm] | Maximum depth A | | Maximum depth B | | Opening width [μm] | White missing spot | Visibility |
| | | | | | groove [μm] | Ratio [%] | protrusion + groove [μm] | Ratio [%] | | | |
| Comp. Ex. 1 | 15 | 50 | 0.015 | 380 | 91 | 23.9 | 101.6 | 26.7 | 990 | C | A |
| Comp. Ex. 2 | 14.25 | 47.5 | 0.01425 | 380 | 78 | 20.5 | 89 | 23.4 | 1005 | B | A |
| Ex. 1 | 14.15 | 47.2 | 0.01415 | 380 | 76 | 20.0 | 87.3 | 23.0 | 1007 | A | A |
| Ex. 2 | 13.2 | 44 | 0.0132 | 300 | 60 | 20.0 | 69 | 23.0 | 1018 | A | A |
| Ex. 3 | 13.95 | 46.5 | 0.01395 | 360 | 72 | 20.0 | 82 | 23.0 | 998 | A | A |
| Ex. 4 | 15.45 | 51.5 | 0.01545 | 500 | 100 | 20.0 | 115 | 23.0 | 1012 | A | A |
| Ex. 5 | 13.5 | 45 | 0.0135 | 380 | 64 | 16.8 | 78 | 20.5 | 1008 | A | A |
| Ex. 6 | 12 | 40 | 0.012 | 380 | 44 | 11.6 | 59.8 | 15.7 | 1141 | A | A |
| Ex. 7 | 10.5 | 35 | 0.0105 | 380 | 32 | 8.4 | 44.9 | 11.8 | 846 | A | A |
| Ex. 8 | 9.75 | 32.5 | 0.00975 | 380 | 20 | 5.3 | 30 | 7.9 | 847 | A | A |
| Ex. 9 | 9 | 30 | 0.009 | 380 | 10 | 2.6 | 14.5 | 3.8 | 622 | A | B |
| Ex. 10 | 8.85 | 29.5 | 0.00885 | 300 | 7.8 | 2.6 | 11.4 | 3.8 | 618 | A | B |
| Ex. 11 | 8.91 | 29.7 | 0.00891 | 360 | 9.4 | 2.6 | 13.7 | 3.8 | 613 | A | B |
| Ex. 12 | 9.3 | 31 | 0.0093 | 500 | 13 | 2.6 | 19 | 3.8 | 620 | A | B |

In Table 1 above, "groove [μm]" denotes a length from the surface of the second support to the bottom of the groove of the laser mark with respect to the thickness direction of the reversible thermosensitive recording medium (maximum depth A).

Moreover, "protrusion+groove [μm]" denotes a sum (maximum depth B) of the length from the surface of the second support to the bottom of the groove of the laser mark with respect to the thickness direction of the reversible thermosensitive recording medium (maximum depth A), and the length from the surface of the second support to an apex of the protrusion of the laser mark with respect to the thickness direction of the reversible thermosensitive recording medium (maximum depth C).

The reversible thermosensitive recording medium of the present invention can form images of excellent quality without leaving any white missing part in an image when an image is formed in the reversible thermosensitive layer after a laser mark has been formed, and can stably carried out coloring and decoloring. Further, the reversible thermosensitive recording medium of the present invention has excellent visibility of the laser mark, and has appropriate flexibility. Accordingly, the reversible thermosensitive recording medium of the present invention can be widely used as reversible thermosensitive recording media with an electronic information recording part (IC chip), in various uses, such as industrial products, stickers for various chemical containers, manuals or work sheets in the manufacturing industries, and instructions (e.g., a parts control manifest, and a process control manifest).

Embodiments of the present invention are as follows:

<1> A reversible thermosensitive recording medium, containing:
a base; and
a reversible thermosensitive recording layer disposed on the base,
wherein the base contains a first support, an electronic information recording module, an adhesive covering the first support, and a second support in a surface of which a groove is formed as a laser mark by laser marking, and
wherein a ratio of a maximum depth A to a total thickness of the reversible thermosensitive recording medium is 20% or less, where the maximum depth A is a length from the surface of the second support to a bottom of the groove of the laser mark with respect to a thickness direction of the reversible thermosensitive recording medium.

<2> A reversible thermosensitive recording medium, containing:
a base; and
a reversible thermosensitive recording layer disposed on the base,
wherein the base contains a first support, an electronic information recording module, an adhesive covering the first support, and a second support in a surface of which a groove and a protrusion along a boundary of the groove are formed as a laser mark by laser marking, and
wherein a ratio of a maximum depth B to a total thickness of the reversible thermosensitive recording medium is 23% or less, where the maximum depth B is a sum of a maximum depth A and a maximum depth C, the maximum depth A is a length from the surface of the second support to a bottom of the groove of the laser mark with respect to a thickness direction of the reversible thermosensitive recording medium, and the maximum depth C is a length from the surface of the second support to an apex of the protrusion of the laser mark with respect to the thickness direction of the reversible thermosensitive recording medium.

<3> A reversible thermosensitive recording medium, containing:
a base; and
a reversible thermosensitive recording layer disposed on the base,
wherein the base contains a first support, an electronic information recording module, an adhesive covering the first support, and a second support in a surface of which a groove and a protrusion along a boundary of the groove are formed as a laser mark by laser marking, and
wherein a ratio of a maximum depth A to a total thickness of the reversible thermosensitive recording medium is 20% or less, and a ratio of a maximum depth B to the total thickness of the reversible thermosensitive recording medium is 23% or less, where the maximum depth A is a length from the surface of the second support to a bottom of the groove of the laser mark with respect to a thickness direction of the reversible thermosensitive recording medium, and the maximum depth B is a sum of the maximum depth A and a maximum depth C where the maximum depth C is a length from the surface of the second support to an apex of the protrusion of the laser mark with respect to a thickness direction of the reversible thermosensitive recording medium.

<4> The reversible thermosensitive recording medium according to any one of <1> to <3>, wherein the laser mark is formed by laser marking at an energy density of 0.0142 W/(mm/s) or lower.

<5> The reversible thermosensitive recording medium according to any one of <1> to <4>, wherein the reversible thermosensitive recording layer contains an electron-donating color-forming compound and an electron-accepting compound.

<6> The reversible thermosensitive recording medium according to any one of <1> to <5>, wherein the reversible thermosensitive recording medium is in the shape of a card or a sheet.

This application claims priority to Japanese application No. 2011-191933, filed on Sep. 2, 2011, and incorporated herein by reference.

What is claimed is:

1. A reversible thermosensitive recording medium, comprising:
a base; and
a reversible thermosensitive recording layer disposed on the base,
wherein the base contains a first support, an electronic information recording module, an adhesive covering the first support, and a second support in a surface of which a groove is formed as a laser mark by laser marking, and
wherein a ratio of a maximum depth A to a total thickness of the reversible thermosensitive recording medium is 20% or less, where the maximum depth A is a length from the surface of the second support to a bottom of the groove of the laser mark with respect to a thickness direction of the reversible thermosensitive recording medium.

2. The reversible thermosensitive recording medium according to is claim 1, wherein the laser mark is formed by laser marking at an energy density of 0.0142 W/(mm/s) or lower.

3. The reversible thermosensitive recording medium according to claim 1, wherein the reversible thermosensitive recording layer contains an electron-donating color-forming compound and an electron-accepting compound.

4. The reversible thermosensitive recording medium according to claim 1, wherein the reversible thermosensitive recording medium is in the shape of a card or a sheet.

5. A reversible thermosensitive recording medium, comprising:
a base; and
a reversible thermosensitive recording layer disposed on the base,
wherein the base contains a first support, an electronic information recording module, an adhesive covering the first support, and a second support in a surface of which a groove and a protrusion along a boundary of the groove are formed as a laser mark by laser marking, and
wherein a ratio of a maximum depth B to a total thickness of the reversible thermosensitive recording medium is 23% or less, where the maximum depth B is a sum of a maximum depth A and a maximum depth C, the maximum depth A is a length from the surface of the second support to a bottom of the groove of the laser mark with respect to a thickness direction of the reversible thermosensitive recording medium, and the maximum depth C is a length from the surface of the second support to an apex of the protrusion of the laser mark with respect to the thickness direction of the reversible thermosensitive recording medium.

6. The reversible thermosensitive recording medium according to claim 5, wherein the laser mark is formed by laser marking at an energy density of 0.0142 W/(mm/s) or lower.

7. The reversible thermosensitive recording medium according to claim 5, wherein the reversible thermosensitive recording layer contains an electron-donating color-forming compound and an electron-accepting compound.

8. The reversible thermosensitive recording medium according to claim 5, wherein the reversible thermosensitive recording medium is in the shape of a card or a sheet.

9. A reversible thermosensitive recording medium, comprising:
a base; and
a reversible thermosensitive recording layer disposed on the base,
wherein the base contains a first support, an electronic information recording module, an adhesive covering the first support, and a second support in a surface of which a groove and a protrusion along a boundary of the groove are formed as a laser mark by laser marking, and
wherein a ratio of a maximum depth A to a total thickness of the reversible thermosensitive recording medium is 20% or less, and a ratio of a maximum depth B to the total thickness of the reversible thermosensitive recording medium is 23% or less, where the maximum depth A is a length from the surface of the second support to a bottom of the groove of the laser mark with respect to a thickness direction of the reversible thermosensitive recording medium, and the maximum depth B is a sum of the maximum depth A and a maximum depth C where the maximum depth C is a length from the surface of the second support to an apex of the protrusion of the laser mark with respect to a thickness direction of the reversible thermosensitive recording medium.

10. The reversible thermosensitive recording medium according to claim 9, wherein the laser mark is formed by laser marking at an energy density of 0.0142 W/(mm/s) or lower.

11. The reversible thermosensitive recording medium according to claim 9, wherein the reversible thermosensitive recording layer contains an electron-donating color-forming compound and an electron-accepting compound.

12. The reversible thermosensitive recording medium according to claim 9, wherein the reversible thermosensitive recording medium is in the shape of a card or a sheet.

* * * * *